(12) United States Patent
Speasl et al.

(10) Patent No.: US 10,977,493 B2
(45) Date of Patent: Apr. 13, 2021

(54) AUTOMATIC LOCATION-BASED MEDIA CAPTURE TRACKING

(71) Applicant: ImageKeeper LLC, Las Vegas, NV (US)

(72) Inventors: Jerry Speasl, Las Vegas, NV (US); Mike Patterson, Sherman, TX (US); Marc Roberts, St. Louis, MO (US)

(73) Assignee: IMAGEKEEPER LLC, Las Vegas, NV (US)

( * ) Notice: Subject to any disclaimer, the term of this patent is extended or adjusted under 35 U.S.C. 154(b) by 27 days.

(21) Appl. No.: 16/262,662

(22) Filed: Jan. 30, 2019

(65) Prior Publication Data

US 2019/0236365 A1 Aug. 1, 2019

Related U.S. Application Data

(60) Provisional application No. 62/624,719, filed on Jan. 31, 2018.

(51) Int. Cl.
*G06K 9/00* (2006.01)
*H04L 9/08* (2006.01)
(Continued)

(52) U.S. Cl.
CPC .......... *G06K 9/00671* (2013.01); *G01S 17/89* (2013.01); *G06K 9/00201* (2013.01);
(Continued)

(58) Field of Classification Search
CPC .......... G06T 2207/30201; G06T 2207/30232; G06K 9/00201; G06K 9/0063; G06K 9/00671; G06K 9/00691; G06K 9/00697; H04L 9/0825; H04L 9/0894; H04L 9/3247; H04L 2209/84; G01S 17/89
See application file for complete search history.

(56) References Cited

U.S. PATENT DOCUMENTS 6,675,386 B1 * 1/2004 Hendricks .......... H04N 7/17318
                                                                      348/143
8,976,172 B2    3/2015   Jones
(Continued)

OTHER PUBLICATIONS

Garfinkel et al., Practical UNIX & Internet Security, 6.5 Message Digests and Digital Signatures, Apr. 1996, 2nd Edition, Chapter 6 Cryptography.
(Continued)

*Primary Examiner* — Katrina R Fujita
(74) *Attorney, Agent, or Firm* — Polsinelli LLP

(57) ABSTRACT

Digital media assets depicting or otherwise representing portions of a property are captured via a media capture device, such as an unmanned vehicle, at various locations about a property. A positioning receiver tracks the location of the media capture device when each digital media asset is captured. A computing device associated with either the media capture device itself or a network-connected server automatically generates location-based categories—such as "front side" or "rear side" or "living room"—automatically based on the plurality of locations so that each location-based category is associated with multiple digital media assets and their corresponding locations.

20 Claims, 16 Drawing Sheets

(51) Int. Cl.
*G01S 17/89* (2020.01)
*H04L 9/32* (2006.01)

(52) U.S. Cl.
CPC ..... *G06K 9/00691* (2013.01); *G06K 9/00697*
(2013.01); *H04L 9/0825* (2013.01); *H04L*
*9/0894* (2013.01); *H04L 9/3247* (2013.01);
*G06T 2207/30232* (2013.01); *H04L 2209/84*
(2013.01)

(56) References Cited

U.S. PATENT DOCUMENTS

| | | | | |
|---|---|---|---|---|
| 9,170,715 | B1* | 10/2015 | Alini | G06Q 30/0627 |
| 10,134,092 | B1* | 11/2018 | Harvey | G06K 9/6201 |
| 10,176,527 | B1* | 1/2019 | Freeman | G02F 1/0121 |
| 10,755,357 | B1 | 8/2020 | Davis et al. | |
| 2004/0257444 | A1* | 12/2004 | Maruya | H04N 7/181 |
| | | | | 348/169 |
| 2009/0307255 | A1* | 12/2009 | Park | G06Q 10/10 |
| 2011/0103773 | A1* | 5/2011 | Johnson | G08B 13/19608 |
| | | | | 386/290 |
| 2012/0179431 | A1* | 7/2012 | Labrie | G06F 30/13 |
| | | | | 703/1 |
| 2012/0268603 | A1* | 10/2012 | Sarna, II | H04N 7/181 |
| | | | | 348/152 |
| 2013/0091432 | A1* | 4/2013 | Shet | G06F 16/532 |
| | | | | 715/719 |
| 2014/0092244 | A1* | 4/2014 | Tang | G06F 16/7837 |
| | | | | 348/143 |
| 2014/0380177 | A1* | 12/2014 | Gutermuth | G06F 3/0482 |
| | | | | 715/736 |
| 2015/0145991 | A1* | 5/2015 | Russell | H04N 7/181 |
| | | | | 348/143 |
| 2015/0287214 | A1* | 10/2015 | O'Gorman | G06T 7/292 |
| | | | | 348/159 |
| 2016/0255282 | A1* | 9/2016 | Bostick | G06T 7/277 |
| | | | | 348/39 |
| 2017/0334559 | A1* | 11/2017 | Bouffard | G08G 5/0082 |
| 2018/0069838 | A1* | 3/2018 | Lee | G06F 21/57 |
| 2018/0130196 | A1 | 5/2018 | Loveland et al. | |
| 2018/0211115 | A1* | 7/2018 | Klein | G08B 29/188 |
| 2019/0050000 | A1 | 2/2019 | Kennedy et al. | |
| 2019/0236365 | A1 | 8/2019 | Speasl | |
| 2019/0385269 | A1 | 12/2019 | Zachary | |

OTHER PUBLICATIONS

2010 SOLIDWORKS Help—Measure, Dassault Systemes, Measurement (Year: 2010).
U.S. Appl. No. 16/262,708 Office Action dated Mar. 3, 2021.

* cited by examiner

AUTOMATIC LOCATION-BASED MEDIA CAPTURE TRACKING

CROSS-REFERENCE TO RELATED APPLICATION

The present application claims the priority benefit of U.S. provisional application No. 62/624,719 filed Jan. 31, 2018 and entitled "Grouping of Segregated Media Captures," the disclosure of which is incorporated herein by reference.

BACKGROUND OF THE INVENTION

1. Field of the Invention

The present invention generally relates to processing media information. More specifically, the present invention relates to grouping of segregated media captures.

2. Description of the Related Art

Property (land) surveying is a technique for evaluating a property (or land), often involving use of a number of sensors and mathematical distance/range calculations. Property surveys may be used in many industries, such as architecture, civil engineering, government licensing, safety inspections, safety regulations, banking, real estate, and insurance. Property or land surveyors may generally map features of three-dimensional areas and structures that may be of interest to a recipient entity. Such feature may include, for example, property boundaries, building corners, land topographies, damage to structures, and the like. Property surveying is traditionally an extremely costly, labor-intensive, and time-intensive process. Any human error that occurs during land or property surveying can have enormous consequences on the land's usage, which can be very difficult to resolve.

Unmanned vehicles are robotic vehicles that do not require an onboard driver or pilot. Some unmanned vehicles may be piloted, driven, or steered by remote control, while some unmanned vehicles may be piloted, driven, or steered autonomously. Unmanned vehicles include unmanned aerial vehicles (UAVs) that fly through the air, unmanned ground vehicles (UGV) that drive, crawl, walk or slide across ground, unmanned surface vehicles (USV) that swim across liquid surfaces (e.g., of bodies of water), and unmanned underwater vehicles (UUV) that swim through volumes of liquid (e.g., underwater), and unmanned spacecraft. Unmanned vehicles can be quite small, as space for a driver, pilot, or other operator is not needed, and therefore can fit into spaces that humans cannot.

There is a need for improved methods and systems for processing and categorization of media assets based on location.

DETAILED DESCRIPTION

Digital media assets depicting or otherwise representing portions of a property are captured via a media capture device, such as an unmanned vehicle, at various locations about a property. A positioning receiver tracks the location of the media capture device when each digital media asset is captured. A computing device associated with either the media capture device itself or a network-connected server automatically generates location-based categories—such as "front side" or "rear side" or "living room"—automatically based on the plurality of locations so that each location-based category is associated with multiple digital media assets and their corresponding locations.

Figure 1A:
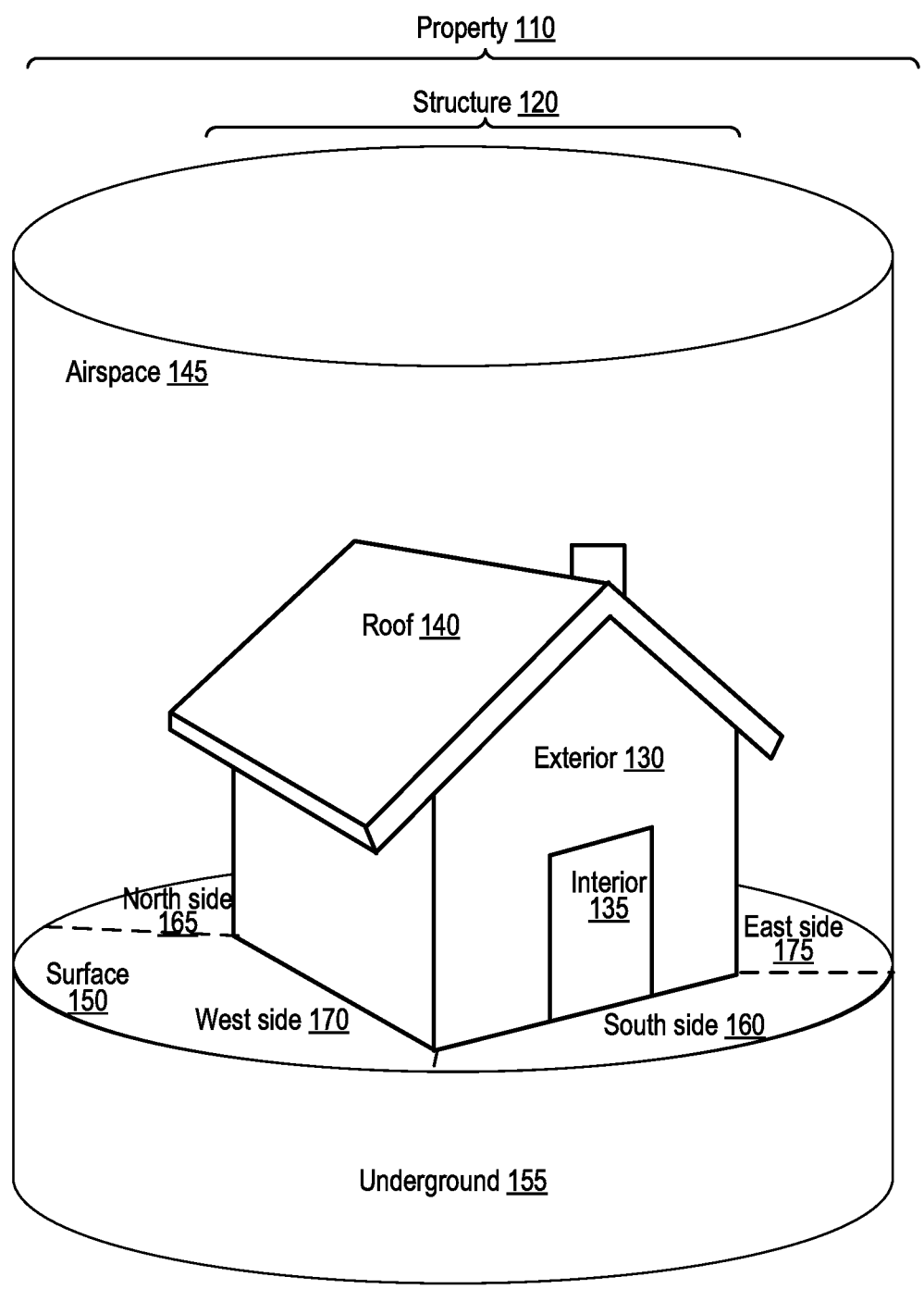
FIG. 1A illustrates a property that includes a structure and that is divided into multiple areas, the areas including outdoor areas.

FIG. 1A illustrates a property that includes a structure and that is divided into multiple areas, the areas including outdoor areas.

The property 110 of FIG. 1A includes a structure 120 with an exterior 130, an interior 135, and a roof 140 (which may be considered part of the exterior 130). The property 110 also includes a ground surface 150 upon which the structure 120 is built, an underground volume 155 underneath the surface 150, and an airspace 145 over the surface 150 of the property 110.

The property 110 of FIG. 1A is divided into areas, including a south side 160, a north side 165, a west side 170, and an east side 175. These areas are defined in FIG. 1A by boundaries illustrated using dotted lines across the surface 150, but may also extend below into the underground volume 155 below the surface 150 and airspace volume 145 above the surface 150. Though the lines are only illustrated outside the exterior 130 of the structure 120, they may also extend into the interior 135 of the structure 120.

Figure 1B:
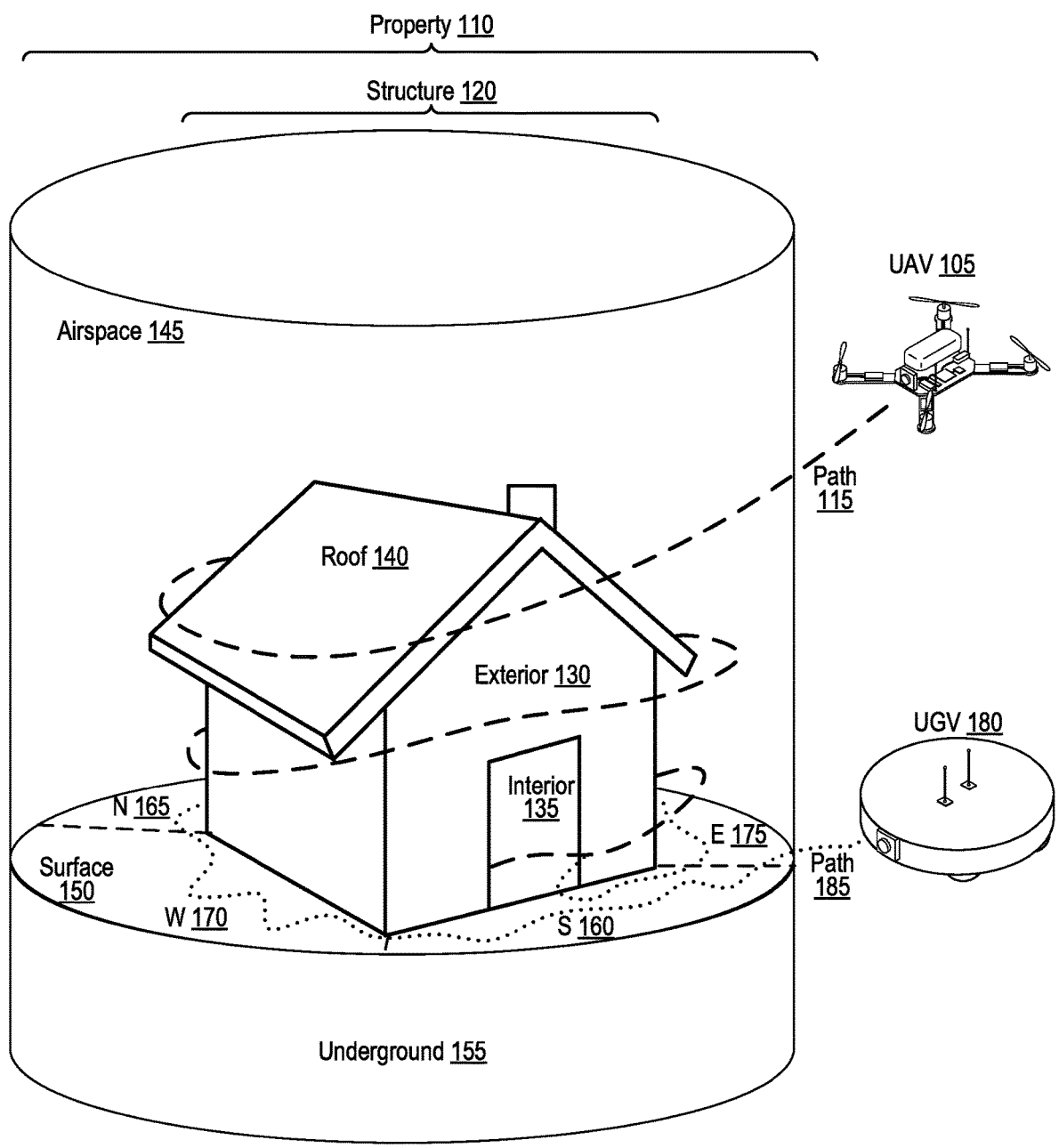
FIG. 1B illustrates two unmanned vehicles guided about the property of FIG. 1A along exemplary paths.
Figure 1C:
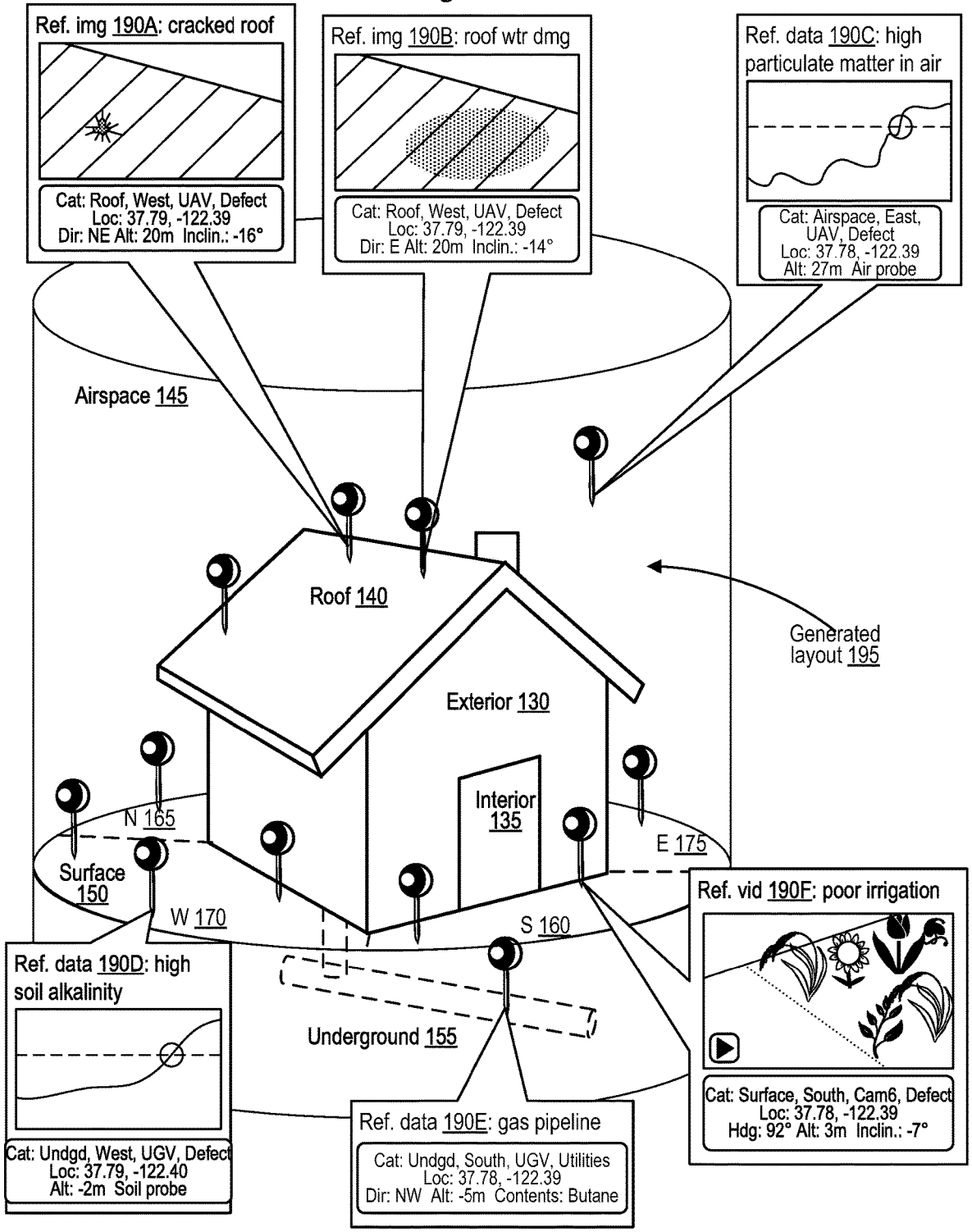
FIG. 1C illustrates an interface that illustrates a generated layout of property of FIG. 1A and that identifies various features of the property and structure of FIG. 1A based on media captured by the two unmanned vehicles of FIG. 1B.

These areas 160, 165, 170, and 175 may correspond to location-based categories for various digital media assets, such as images, audio, and videos, captured about the property 110 as illustrated in and discussed further with respect to FIG. 1C, and may be generated automatically after capture of at least a subset of the digital media assets based on the locations of those captures as identified in metadata associated with those captures. For example, the four areas 160, 165, 170, and 175 of FIG. 1A may be defined automatically so that each area includes the same number of digital media captures, or a similar number (e.g., a range from one number to another number or a range around a particular number).

FIG. 1B illustrates two unmanned vehicles guided about the property of FIG. 1A along exemplary paths.

The two unmanned vehicles illustrated in FIG. 1A include an unmanned aerial vehicle (UAV) 105 that travels along a path 115 and an unmanned ground vehicle (UGV) 180 that travels along a path 185. The UAV 105 is illustrated in and discussed further with respect to FIG. 7A, The UGV 180 is illustrated in and discussed further with respect to FIG. 7B. Though no body of water (or any other liquid) is explicitly illustrated within the property 110 illustrated in FIG. 1A and FIG. 1B, it should be understood that such a body of water may exist within a property 110, and in such cases, unmanned surface vehicles (USV) that swim across liquid surfaces (e.g., of bodies of water) may be used to capture digital media assets about the liquid body, as may unmanned underwater vehicles (UUV) that can swim below the surfaces of volumes of liquid (e.g., underwater).

The unmanned vehicles 105 and 180 illustrated in FIG. 1A collect digital media data through various sensors of the unmanned vehicles 105 and 180 about different locations along respective paths 115 and 185 about a property 110 that includes at least one structure 120. The UAV 105 in particular flies a path 115 through the airspace 145 of the property 110 about the exterior 130 of the structure 120 (including about the roof 140), over the surface 150 and eventually into the interior 135 of the structure, optionally including a basement and/or attic. Along the way, the UAV 105 captures digital media assets, such as photos, videos, audio recordings, air quality tests, RADAR images, SONAR image, LIDAR images, and other sensor measurements at many locations along its path 115 using an array of sensors of the UAV 105. The UGV 180 drives a path 185 over the surface 150 around the structure 120, and may likewise capture digital media assets, for example by testing pH of soil or running an assay of soil either from the surface 150 or the underground volume 155 at various points along the path 185 while outside the structure 120. The path 185 of the UGV 180 is also illustrated entering the interior 135 of the structure 120 after going around the structure 120, optionally including a basement and/or attic. Once the unmanned vehicles 105 and 180 are in the interior 135 the structure 120, they may traverse the interior and continue to capture digital media assets, and may optionally map or model a virtual layout of the interior 135 as discussed further with respect to FIG. 2A, FIG. 2B, and FIG. 2C.

FIG. 1C illustrates an interface that illustrates a generated layout of property of FIG. 1A and that identifies various features of the property and structure of FIG. 1A based on media captured by the two unmanned vehicles of FIG. 1B.

In particular, the interface of FIG. 1C illustrates the property 110 with pins corresponding to locations in the property at which particular digital media assets were captured. Some of these digital media assets are illustrated and expanded upon in FIG. 1C as reference data 190A-190F. Locations at which each of the digital media assets and data gathered by the sensors of the UAV 105, the sensors of the UGV 180, and optionally other sensors (on unmanned vehicles or otherwise) may be tracked and stored in metadata, which may be certified according to processes outlined in FIG. 11 and FIG. 12, The digital media assets are illustrated in FIG. 1C as references in the interface of FIG. 1C positioned about a generated layout 195, map, or model of the property 110. These references may also be referred to as "links" or "hyperlinks" or "pointers," and each is positioned at a specific location within the layout 195 that corresponds to the location in the property 110 at which the particular digital media asset was captured. A user viewing the interface of FIG. 1C may then view the original media data captured at the corresponding location within the actual property. Thus, a user can click, touch, or otherwise interact with a specific location the interface of FIG. 1C to bring up a photograph or a video captured by the UAV 105, UGV 180, or another sensor from which media data was captured and used to generate the layout 195 or to supplement the layout 195 with localized data, such as data regarding water quality or soil sample analysis at a particular location within the property 110.

For example, a first reference 190A is a reference image 190A identifying damage to the roof 140. Capture data associated with the reference image 190A shows it was captured at latitude/longitude coordinates (37.79, −122.39), that the sensor of the digital media capture device was facing north-east at the time of capture (more precise heading angle data may be used instead), that the capture device was at an altitude of 20 meters when this image 190A was captured, and that the inclination of the capture device's sensor was −16 degrees at capture. The image 190A has been automatically filed into the "roof" location-based category since the photo is of the roof 140, the "west" location-based category since the photo is in the west side area 170, the "UAV" device-based category since the photo was captured by a camera of the UAV 105, and the "defect" subject-based category since a subject of the photo is a defect (the crack in the roof).

A second reference 190B is a reference image 190B identifying water damage to the roof 140. Capture data associated with the reference image 190B shows it was captured at latitude/longitude coordinates (37.79, −122.39), that the sensor of the digital media capture device was facing east at the time of capture (more precise heading angle data may be used instead), that the capture device was at an altitude of 20 meters when this image 190B was captured, and that the inclination of the capture device's sensor was −14 degrees at capture. The image 190B has been automatically filed into the "roof" location-based category since the photo is of the roof 140, the "west" location-based category since the photo is in the west side area 170, the "UAV" device-based category since the photo was captured by a camera of the UAV 105, and the "defect" subject-based category since a subject of the photo is a defect (the water damage on the roof).

A third reference 190C is reference data 190C identifying a high amount of particulate matter in the airspace 145. Capture data associated with the reference data 190C shows it was captured at latitude/longitude coordinates (37.78, −122.39) and that the sensor of the digital media capture device was at an altitude of 20 meters when this data 190C was captured/measured using an air probe. The data 190C has been automatically filed into the "airspace" location-based category since the data is a measurement of the air in the airspace 145, the "east" location-based category since the data was captured in the east side area 175, the "UAV" device-based category since the photo was captured by an air quality (particulate matter) sensor of the UAV 105, and the "defect" subject-based category since a subject of the data is a defect (air pollution).

A fourth reference 190D is reference data 190D identifying a high amount of alkalinity in the soil underground 155. Capture data associated with the reference data 190D shows it was captured at latitude/longitude coordinates (37.79, −122.40) and that the sensor of the digital media capture device was at an altitude of −2 meters when this data 190D was captured/measured. The data 190D has been automatically filed into the "underground" location-based category since the data is a measurement of the soil underground 155, the "west" location-based category since the data was captured in the west side area 170, the "UGV" device-based category since the data was captured by a soil sensor of the UGV 180, and the "defect" subject-based category since a subject of the data is a defect (excessive soil alkalinity).

A fifth reference 190E is reference data 190E identifying the existence of a gas pipeline underground 155. Capture data associated with the reference data 190E shows the data was captured at latitude/longitude coordinates (37.78, −122.39), that the pipeline extends in the northwest direction and is at an altitude of −5 meters at the location where the pipeline was detected, The data 190E also indicates that the gas pipeline contains butane. for example via ground-penetrating radar (GPR). The data 190E has been automatically filed into the "underground" location-based category since the data corresponds to pipeline that is underground 155, the "south" location-based category since the data was captured in the south side area 160, the "UGV" device-based category since the data was captured by a sensor (e.g., GPR) of the UGV 180, and the "utilities" subject-based category since a subject of the data is a utility (gas pipeline).

A sixth reference 190F is a reference video 190F showing an area with poor or improper irrigation, where plants are shown growing well on the right side of a dotted line and no plants are visible growing on the left side of the dotted line. A play button is visible, which may for example play a video of the plants illustrated on the right side of the dashed line being watered while the soil on the left side of the dashed line is not watered or is watered improperly. Capture data associated with the reference video 190F shows it was captured at latitude/longitude coordinates (37.78, −122.39), that the sensor of the digital media capture device was facing a heading of 92 degrees at the time of capture, that the capture device was at an altitude of 3 meters when this video 190F was captured, and that the inclination of the capture device's sensor was −7 degrees at capture. The data 190F has been automatically filed into the "surface" location-based category since the data was captured at the surface 150, the "south" location-based category since the data was captured in the south side area 160, the "Cam6" device-based category since the data was captured by a camera ("Camera 6") trained on the plants, and the "defect" subject-based category since a subject of the data is a defect (improper irrigation).

While only six reference digital media assets 190A-F are illustrated in FIG. 1C, a number of additional pins are illustrated, each indicating an additional digital media asset capturing media data about a corresponding location along the property. In particular, each area (south 160, north 165, west 170, east 175) includes at least one pin.

In some cases, the media capture device (e.g., UAV 105 or UGV 180), or a server 525 or other computer system 1300 that the media capture device sends its media data to and/or synchronizes its media data with upon capture, may automatically identify irregularities in the property such as defects or damage, and automatically mark those areas with reference media assets such as the reference media 190A, 190B, 190C, 190D, and 190F. Similarly, unusual or not readily visible aspects of the property 110 that are detected via sensors, such as the existence of the gas pipeline underground 155 (or electrical/internet/phone/TV cables), may likewise be automatically detected within media (such as a GPR sensor image) and automatically marked with reference media/data, such as reference data 190E.

Other reference data or reference media not illustrated in FIG. 1C may nonetheless also be included. For instance, reference data may identify expected or observed air traffic patterns through and around the airspace 145, or at and around the nearest airport to the property 110, and/or expected or observed audio levels resulting from such air traffic. Reference data may identify expected or observed smoke or smog or other air pollution measured in the airspace 145, for example in the form of an air quality index (AQI) or air quality health index (AQHI) or particulate matter (PM) index, which may be caused by nearby sources of pollution, such as airports, factories, refineries, vehicles, streets, highways, landfills, wildlife, and the like. Reference data may identify expected or observed smells or odors in the property 145, for example due to any of the sources of pollution discussed above in or near the property 110. Reference data may identify expected or observed levels of carbon dioxide and/or of asbestos brake lining dust in highway corridors. Reference data may identify expected or observed levels of pollen, dander, or other common biological and synthetic allergens and irritants. Reference data may identify expected or observed levels of flu or other illnesses in or around the property 110. Reference data may identify an expected or observed ultraviolet index (UVI) identifying danger from the sun's ultraviolet (UV) rays in or around the property 110. Reference data may identify expected or observed levels of rainfall, expected or observed levels of humidity, expected or observed dew point, expected or observed visibility levels, expected or observed air pressure, and other expected or observed environmental parameter levels. Reference data may identify presence of underground or above-ground power lines, transmission lines, transformers, generators, power plants, wind turbines, wind turbine farms, solar panels, or other electrical equipment, or effects of such items, such as radiation, pollution, wind turbine rotor noise, or wind turbine visual shadow flicker irritation. Reference data may identify presence of underground or above-ground cable lines, internet data lines, fiber optic data lines, broadband lines, or other data line equipment.

Figure 7A:
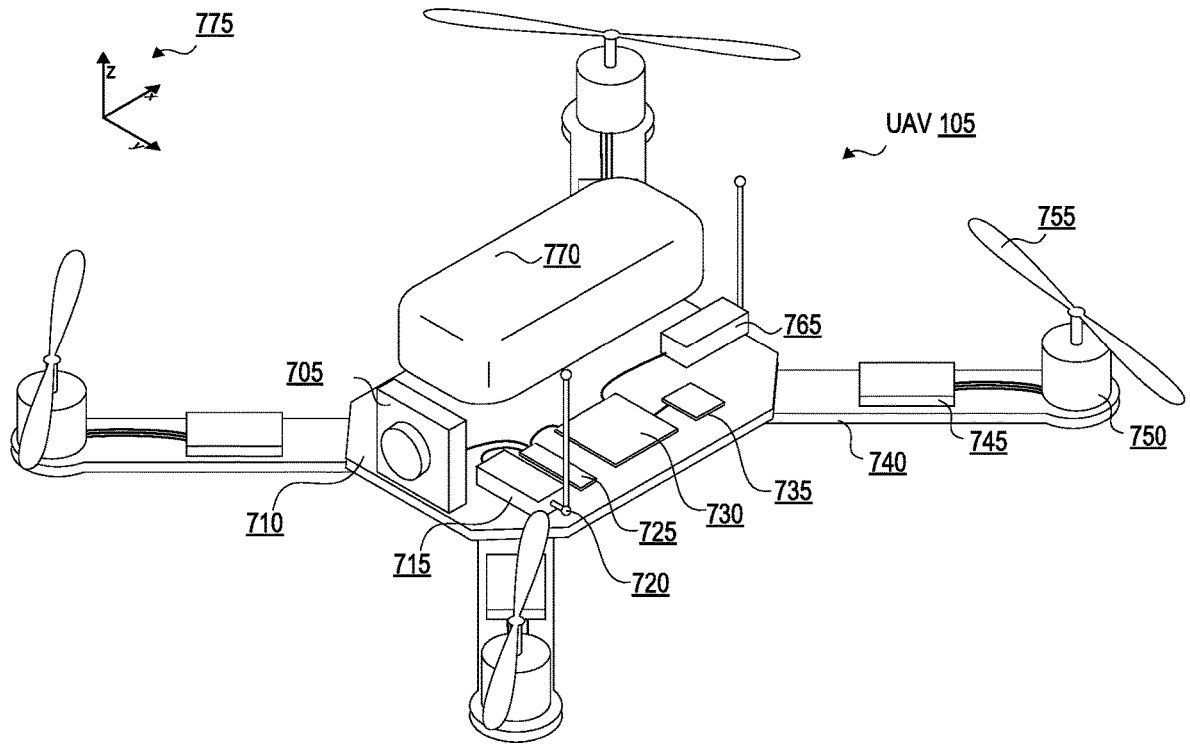
FIG. 7A illustrates an unmanned aerial vehicle (UAV).
Figure 7B:
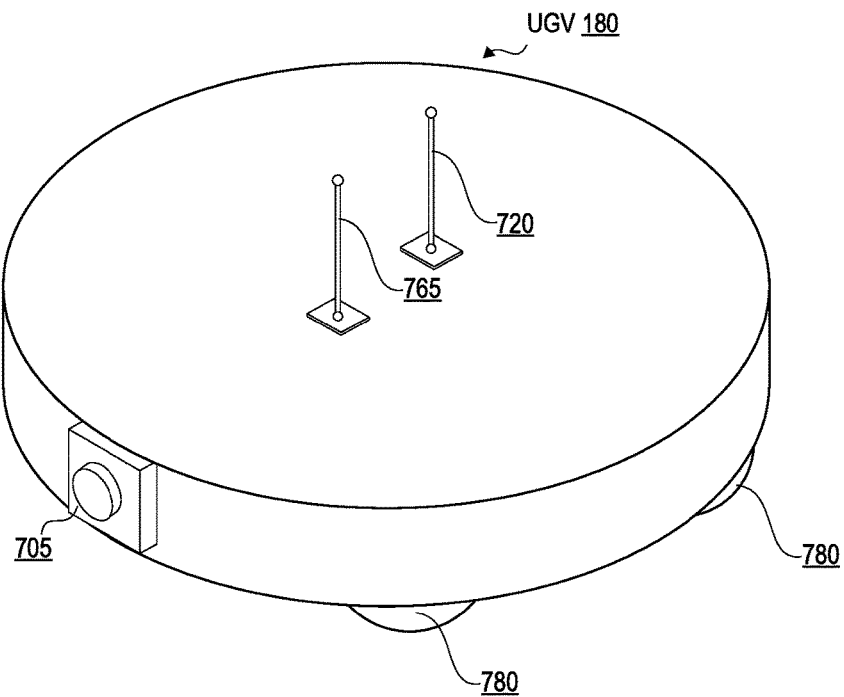
FIG. 7B illustrates an unmanned ground vehicle (UGV).
Figure 13:
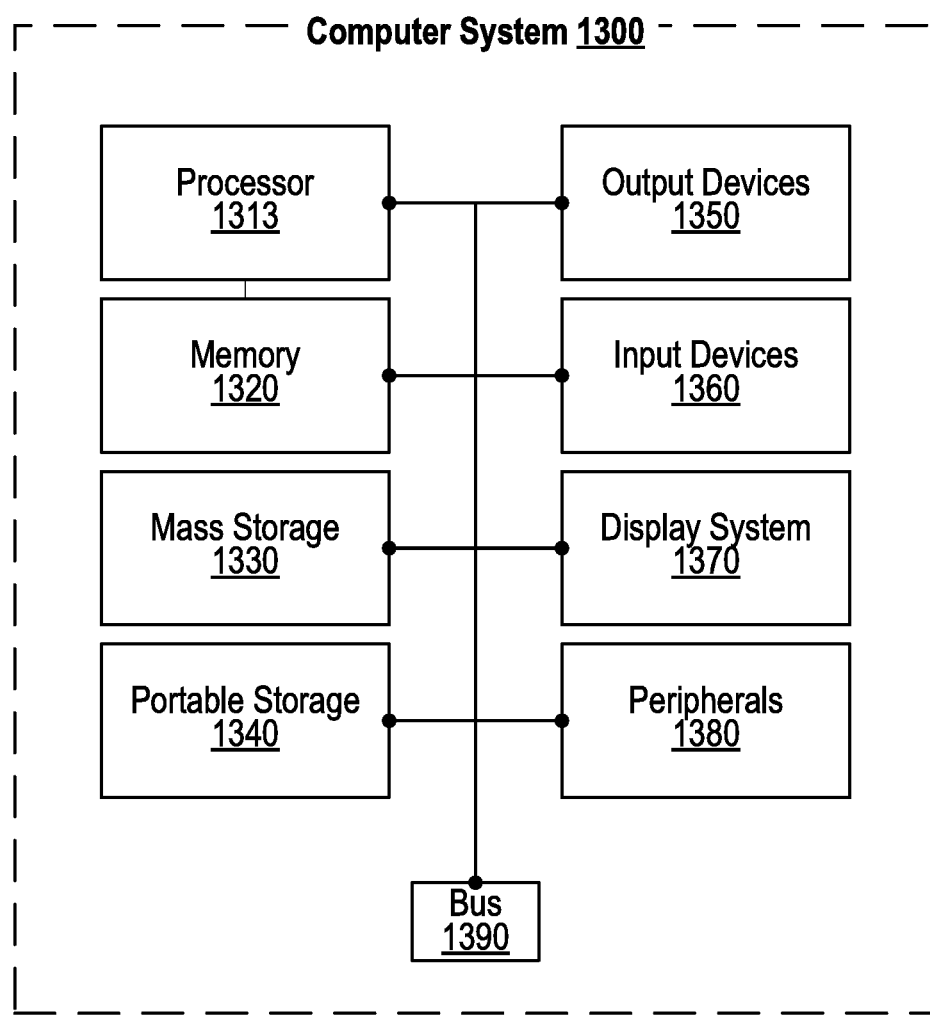
FIG. 13 is a block diagram of an exemplary computing device that may be used to implement some aspects of the technology.

The digital media assets may include, for example, photos or videos from cameras, range measurements or range "images" or range "videos" from a range sensor, outputs of any other sensor discussed with respect to FIG. 7A, FIG. 7B, or FIG. 13, or combinations thereof. Range sensors may include sonic range sensors, such as sonic navigation and ranging (SONAR) or sonic detection and ranging (SODAR) sensors. Range sensors may include electromagnetic range sensors such as laser rangefinders or electromagnetic detection and ranging (EmDAR) sensors such as radio detection and ranging (RADAR) sensors or light detection and ranging (LIDAR) sensors. Range sensors may include proximity sensors.

Other sensors, such as thermometers, humidity sensors, or other environmental sensors may be used as well, and their data may be identified in the layout 195 as illustrated in and discussed with respect to FIG. 1B. Data of other types may be gathered, either through sensors or from network-based data sources, such as data regarding crime, weather, prices, property title, property tax details, property ownership history, property use history, property zoning history, radioactivity history, water quality, earthquake faults, sink holes, solar details and angles, underground details, water quality, sea level, sea level changes, insects issues, local wildlife, altitude and elevation data, flood history, airspace information, air traffic patterns, property history, toxic history and maps, traffic history, or combinations thereof.

Figure 2A:
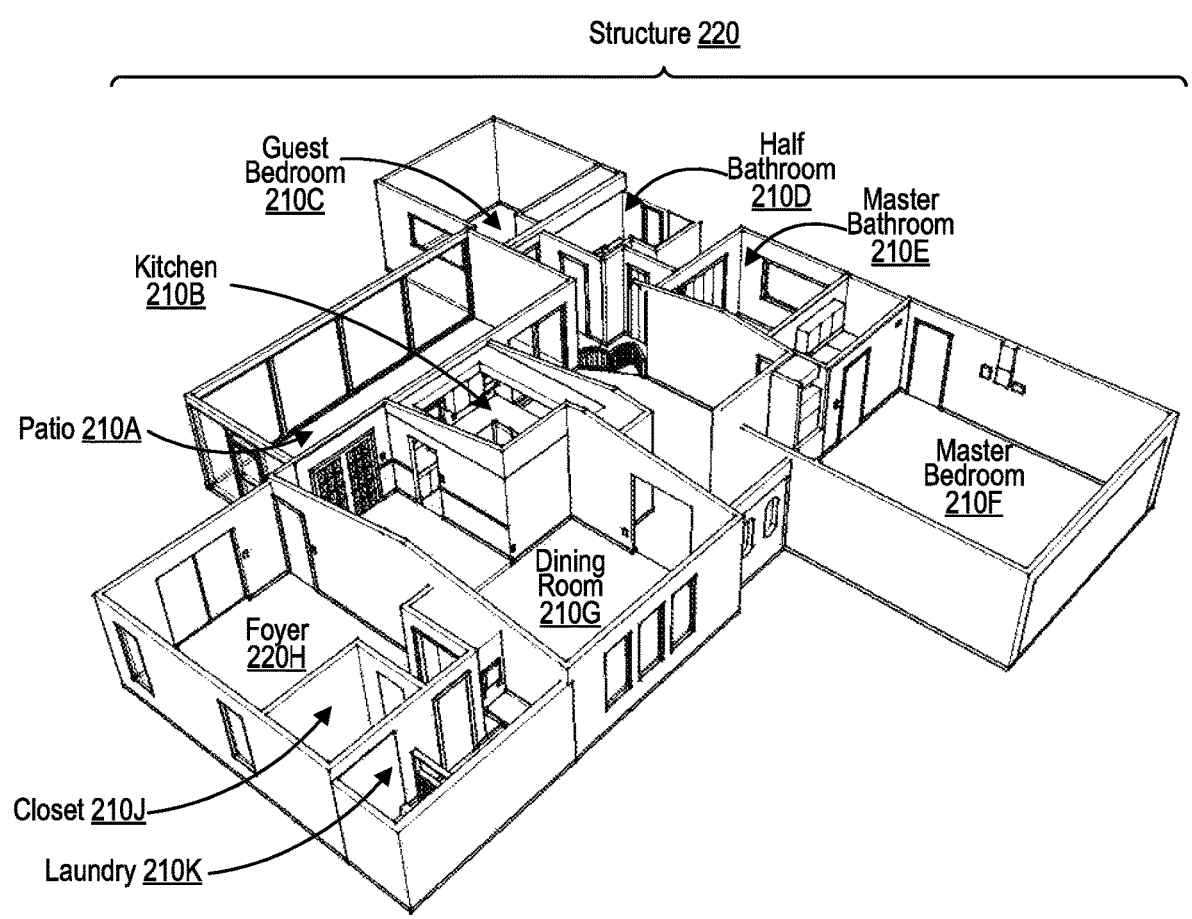
FIG. 2A illustrates a property that includes a structure and that is divided into multiple areas, the areas including specific rooms.

FIG. 2A illustrates a property that includes a structure and that is divided into multiple areas, the areas including specific rooms.

In particular, the structure 220 of FIG. 2A includes ten labeled rooms—a patio 210A, a kitchen 210B, a guest bedroom 210C, a half bathroom 210D, a master bathroom 210E, a master bedroom 210F, a dining room 210G, a closet 210J, and a laundry room 210K.

Figure 2B:
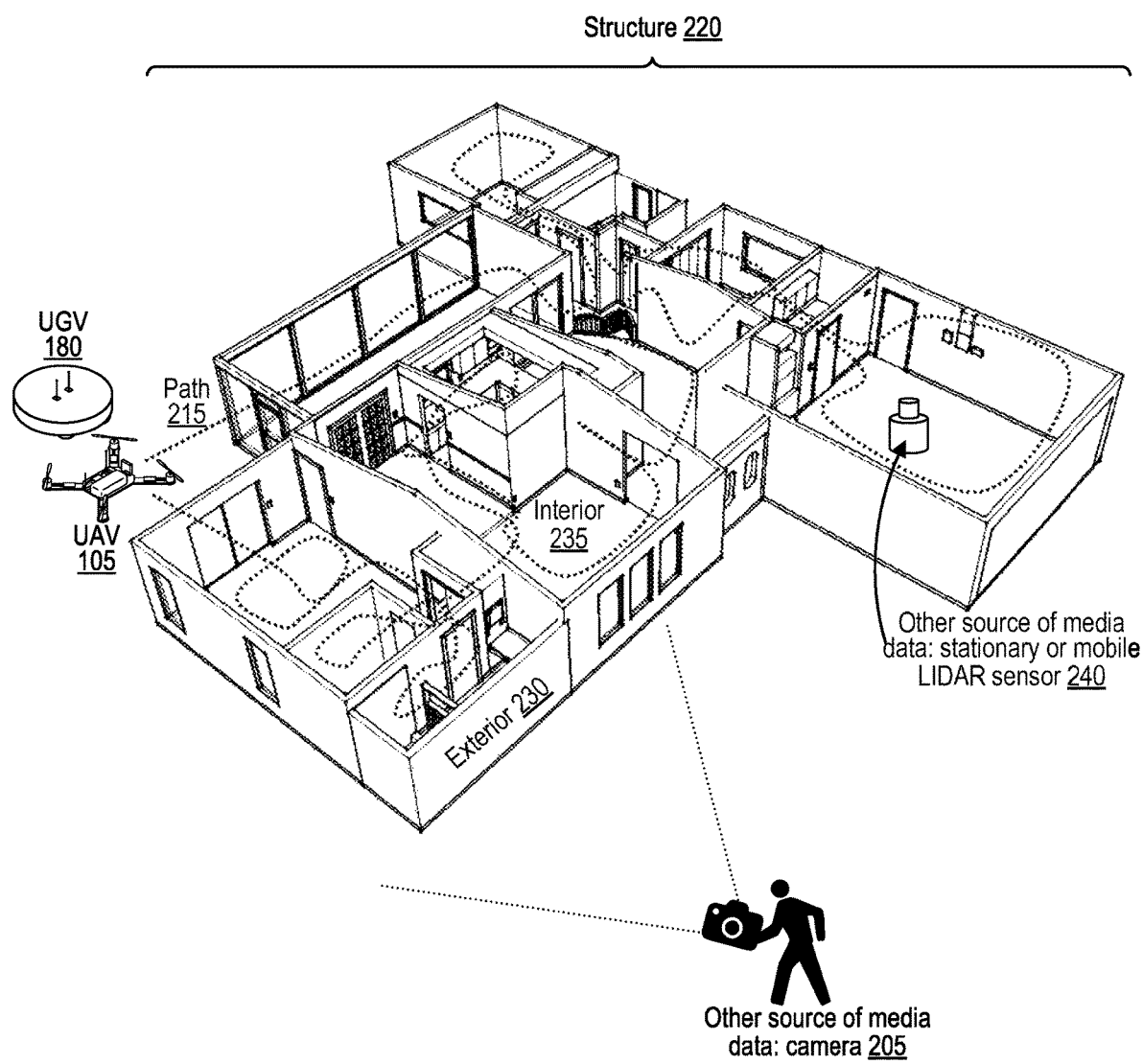
FIG. 2B illustrates an unmanned vehicle guided about an interior of the structure of FIG. 2A and a user-operated camera that captures media of an exterior of the structure of FIG. 2A.

FIG. 2B illustrates an unmanned vehicle guided about an interior of the structure of FIG. 2A and a user-operated camera that captures media of an exterior of the structure of FIG. 2A.

The UAV 105 and/or UGV 180 of FIG. 2B travels about a path 215 through at least a majority of the interior 235 of a structure 220, including through each of the rooms 210A-K identified in FIG. 2A. The UAV 105 and/or UGV 180 captures digital media assets at multiple locations throughout the interior 235 of the structure along the path 215. A user with a camera 205 captures images of at least portions of the exterior 230 of the structure 220 while walking about the exterior 230 of the structure 220. A stationary or mobile (e.g., self-propelled) light detection and ranging (LIDAR) sensor 240 is also present in a particular room in the interior 235 of the structure.

Like the autonomous vehicles in FIG. 1B, the UAV 105 of FIG. 2B may plot or be guided on its path 215 remotely, autonomously, semi-autonomously, or some combination thereof. While a UGV 180 can also be used in the UAV 105's place or to supplement UAV 105 as illustrated in FIG. 2B, a UAV 105 may provide some advantages over a UGV 180, such as being able to use windows, chimneys, pipes, garage doors, ventilation passages, basements, crawl spaces, or other alternative openings other than ordinary doorways to enter and/or exit the structure 220, or to navigate through the interior 235 of the structure 220.

The UAV 105 and/or UGV 180 of FIG. 2B—or any other unmanned or autonomous vehicle—may also include and execute instructions corresponding to pathfinding algorithms that can be used to navigate through a layout of the structure 120 that the unmanned vehicle may generate automatically as it navigates through the structure, to avoid walls and other obstacles once the layout is at least partially generated. For example, if the UAV 105 examines the dimensions of an exterior of the structure 220, and then starts mapping the layout of the interior 235 of the structure 220, it can determine based on the exterior dimensions that a specified area—such as a particular corner of the structure or a particular room—has not yet been mapped and incorporated into the layout. It can then use a pathfinding algorithm with what it has so far of the layout to find its way to the unmapped area to scan it with its sensors and integrate it into its generated layout 290 mapping the structure 220 as in FIG. 2C. A pathfinding algorithm can also help the UAV 105 find its way to an entrance or exit of the structure 220 in order to exit the structure 220 once mapping the structure 220 into the generated layout is complete. Pathfinding algorithms that might be used here may include breadth-first search algorithm, depth-first search algorithm, Dijkstra's algorithm, A* search algorithm, hierarchical path finding, D* search algorithm, any-angle path planning algorithms, or combinations thereof. Multi-agent pathfinding may also be used where multiple unmanned vehicles are used in tandem to avoid collisions.

Additional data can be automatically processed and combined with the data collected here. For example, data can be collected using digital cameras, clipboards, paper forms, MLS website and tape measures. Data can be collected from various sources for potential for increased risk to water property locations, air traffic, current and predictive crime mapping, current flood risk and past flood historical locations and depths, solar efficiency of the property to produce solar power, internet service speeds available by what service, cellular service signal strength, underground utilities, age, fittings, gas valves, product recalls of defective natural gas shutoff valves, property sink hole locations, mapping property to the nearest earthquake fault line, property records, history, tax lien search, title searches, federal building code records, state building code records, municipal building code records, local building code records, building code record verifications and approvals, tax liens, police incident report histories, crime reports, ground quality reports, earthquake and fault line reports, air quality reports, water quality reports, reports of nearby industries, reports of nearby air/ground/water pollutants (airports, factories, refineries), property measurements, structure measurements, physical conditions, sales records, and comps for properties that are considered similar in size and location to the property.

Data collected may also be from navigation satellites incorporating L3, L4 signals, virtual sensors; drones, aircraft, satellites, mobile digital devices, telematics, holographic, connected home data supported the cloud repository and by the enhanced 3rd party data will form an automated system to generate a completed, secure, property level intelligence appraisal system describing property values, certified property geo location, visualization media, market trends, property conformity information, property risks, usage history for heating systems, usage history for cooling systems, usage history for predictive sales price predictions, and appraised value on a specific date. Data collected may also include incorporation of virtual spatial solutions and telematics from connected home system, social media sources, property purchasing websites, property rental websites, cellular network data, wired home network data, doorbell systems, home security systems, virtual sensors, alarms, autonomous vehicles, drones, planes, internet of things (IOT), communications systems, cable etc. which provide true and accurate unmodifiable/immutable certified facts and deliver instant actual digital evidence information, visualization, situational awareness, precise 3D location, elevation, understanding and awareness of property level intelligence for virtual handling of claims, appraisals, and valuations.

Figure 2C:
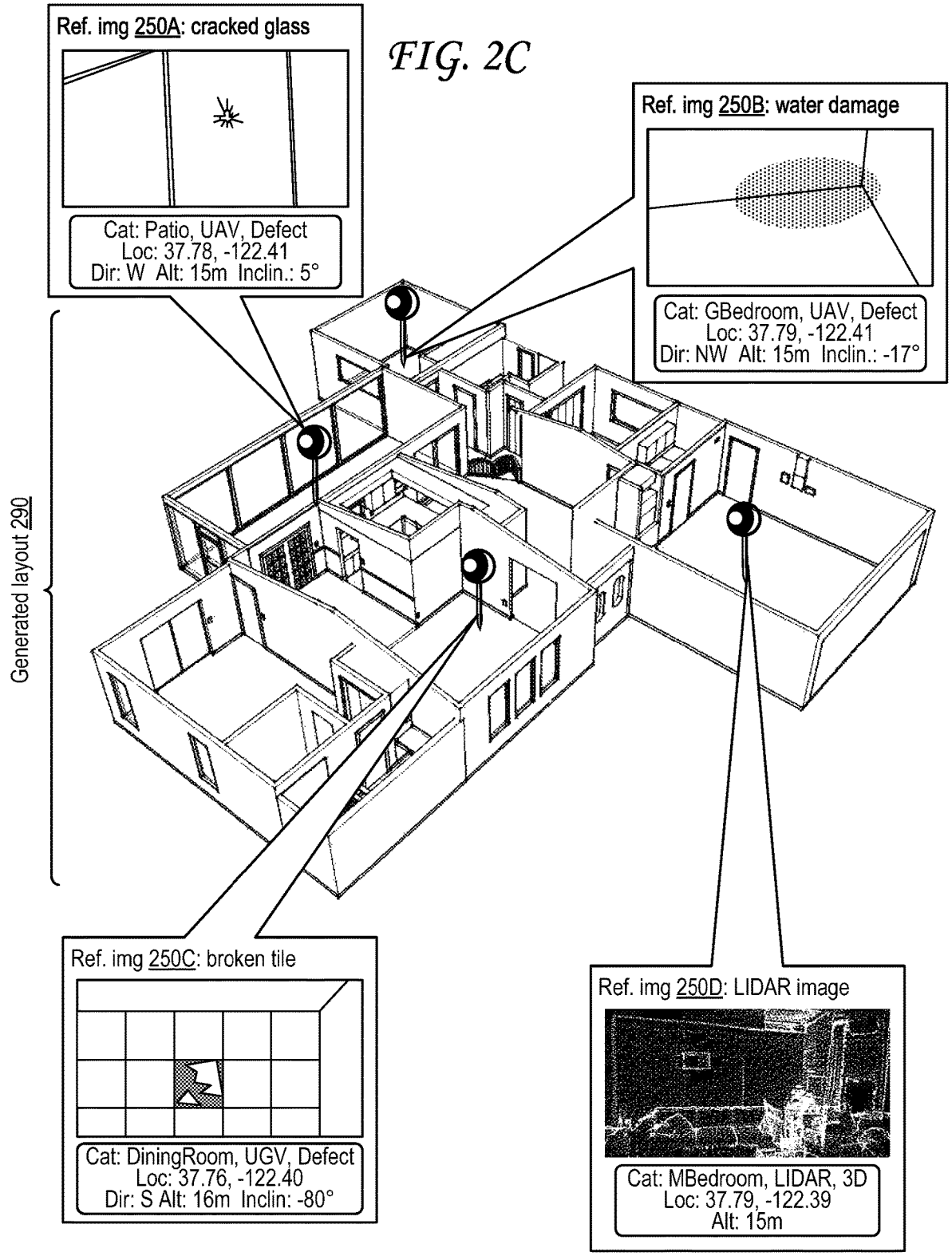
FIG. 2C illustrates an interface that illustrates a generated layout of property of FIG. 2A and that identifies various features of the property and structure of FIG. 2A based on media captured by the unmanned vehicle of FIG. 2B.

FIG. 2C illustrates an interface that illustrates a generated layout of property of FIG. 2A and that identifies various features of the property and structure of FIG. 2A based on media captured by the unmanned vehicle of FIG. 2B.

Like the generated layout 195 of FIG. 1C, the generated layout 290 of FIG. 2C includes references to digital media assets such as images.

Reference image 250A is an image of a cracked pane of glass automatically identified within the captured media, and captured at latitude and longitude coordinates (37.78, −122.41) while the capture device (UAV 105) faced west at an altitude of 15 meters and an inclination of 5 degrees. Reference image 250A is automatically categorized into location-based category "patio" based on being captured in the patio area 210A, into device-based category "UAV" based on being captured by the UAV 105, and into the subject-based category "Defect" based on the image 250A depicting a defect (i.e., a crack in a pane of glass).

Reference image 250B is an image of water damaged walls and floor automatically identified within the captured media, and captured at latitude and longitude coordinates (37.79, −122.41) while the capture device (UAV 105) faced north-west at an altitude of 15 meters and an inclination of −17 degrees. Reference image 250B is automatically categorized into location-based category "GBedroom" based on being captured in the guest bedroom area 210C, into device-based category "UAV" based on being captured by the UAV 105, and into the subject-based category "Defect" based on the image 250B depicting a defect (i.e., water damage in the corner of a room).

Reference image 250C is an image of a broken tile in a tiled floor or countertop automatically identified within the captured media, and captured at latitude and longitude coordinates (37.76, −122.40) while the capture device (UGV 180) faced south at an altitude of 16 meters and an inclination of −80 degrees. Reference image 250C is automatically categorized into location-based category "DiningRoom" based on being captured in the dining room area 210G, into device-based category "UGV" based on being captured by the UGV 180, and into the subject-based category "Defect" based on the image 250C depicting a defect (i.e., a broken tile).

Reference LIDAR image 250D is a LIDAR range-image captured using the stationary or computer-guided autonomous mobile LIDAR sensor 240 at an altitude of 15 meters. Reference image 250D is automatically categorized into location-based category "MBedroom" based on being captured in the master bedroom area 210F, into device-based category "LIDAR" based on being captured by the LIDAR sensor 240, and into the subject-based category "3D" based on the image 250F depicting a three-dimensional image of the master bedroom generated using distance measurements captured by the LIDAR sensor 240.

While all four reference images 250A-D of FIG. 2C are placed into broad subject-based category "defect"—as are references 190A, 190B, 190C, 190D, and 190F of FIG. 1C—it should be understood that different and more granular/specific subject-based categories may be used. For example, all cracks, breaks, holes, and other fractures may be categorized under a subject-based "fracture" category. All water damage may be categorized under a subject-based "water damage" category. All air, water, and soil pollution measurements damage may be categorized under a subject-based "pollution" category. Any electrical issues may be categorized under a subject-based "electrical" category. Any water issues, such as the poor irrigation of reference video 190F of FIG. 1C, may be categorized under a subject-based "water" category.

Specific objects or types of objects may acquire their own categories as well. Human faces may all be categorized under a subject-based "face" category. Media depicting a known person—say, John Smith—may be categorized under a subject-based "JohnSmith" category. Media depicting an appliance may be categorized under a subject-based "appliance" category. Media depicting the same brand of appliance—such as a refrigerator bearing a brand name or logo—may be categorized under subject-based "brand" and "refrigerator" categories. Plants may be categorized into a general "plant" category, and/or into more narrow categories, such as "Geranium" or "Hydrangea" or "Dahlia" or "Citrus" or "Lemon" or "Meyer Lemon."

In some cases, categories can be formed based on types of the subjects/objects identified in the media. For example, if twenty images are determined via object recognition to show human faces, a "face" category may be formed. In some cases, certain categories may be pre-determined (e.g., based on a designated set of criteria or parameters), and media may be specifically searched through to find instances of corresponding subjects/objects. For example, a "water damage" category may be pre-formed before sending a UAV 105 out on a mission; as the UAV 105 captures digital media assets, object recognition may be run on each digital media asset specifically looking for water damage to identify whether the digital media asset should be placed in the "water damage" subject-based category.

Object recognition may use numerous techniques, including edge detection, edge matching, gradient matching, luminosity or illumination matching, color matching, feature matching, surface patch matching, corner matching, linear edge matching, pose consistency, pose clustering, invariance, geometric hashing, scale-invariant feature transform (SIFT), speeded-up robust features (SURF), genetic algorithms, 3D reconstruction, artificial neural networks, deep learning, gradient histogram matching, stochastic grammars, reflectance, shading, template matching, texture matching, topic models, window-based detection, Bingham distribution, and combinations thereof. These may be used to categorize digital media assets into subject-based categories, and may be executed by processors at the digital media capture device, at a server 525, at a viewer device or client device 530, or some combination thereof.

Figure 9:
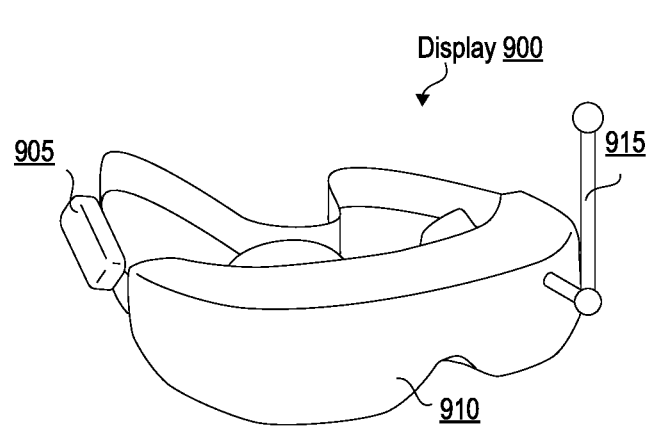
FIG. 9 illustrates a head-mounted display for viewing media captured by an unmanned vehicle or other media capture device.

In some cases, a user might walk through the structure 220 wearing an augmented reality headset after having generated the layout 290. Alternately, a user wearing a virtual reality headset (e.g., smart glasses) or otherwise viewing a virtual reality or telepresence viewing device may virtually traverse the layout 290. FIG. 9 illustrates an exemplary head-mounted display 900. Either way, as the user traverses the structure 220 or layout 290, the reference images identified in FIG. 2C—and any other reference media assets collected—may appear, superimposed, over the structure 220 (in augmented reality) or layout 290 (in virtual reality) where appropriate. In some cases, these may be pre-filtered by category, so that only certain categories of reference media appears. In some cases, the user can also bring up other media, such as other images, captured of areas that were not automatically flagged as important reference data like those flagged in FIG. 2C, in the same way automatically or upon request (e.g., by pressing a button or otherwise inputting a particular command).

While FIG. 1A-C and FIG. 2A-C illustrate various media capture operations at various types of properties and structures, others are possible. For example, properties may include aerial pipes, underwater pipers, internal pipes in a structure, ductwork, sewer lines, water lines, automobiles, aircraft, trains, trucks, and any other stationary or mobile area or volume.

Digital media capture devices may include a variety of devices, including visible/multispectral camera sensors, automobile cameras, body cameras, head mounted camera equipped glasses, VR/AR headsets/glasses, home security system cameras or motion sensors, business security system cameras or motion sensors, UAVs 105, UGVs 180, USVs, UUVs, vehicle cameras or sensors on other vehicles such as trains or boats or trucks or aircraft, various Internet-of-things (IOT) home or office sensors, smartphone cameras and other sensors, tablet cameras and other sensors, clocks (time), calendars (date), compasses for magnetic north, compasses with corrections for true north, time zone identification, other orientation sensors, heading, inclination, altitude/elevation from sea level, barometer reading, temperature, wind direction, wind speed, sun angle, current weather conditions, interface with speech interface, voice recognition, keyboard, voice recording, speakers, accelerometers, United States GPS, Europe's Galileo, China's Beidou, Russia's GLONASS GPS location, communications, transmission and electronic networks any other sensors described herein, or combinations thereof.

Categories can also be based on metadata that identifies users using the digital media capture device, groups of users (e.g., schools, employers), groups of product types being used, which users are using what digital devices, movement, speed of movement, start and stop times, GPS location of users, GPS fencing of users, time in the GPS fence box, places grouped, things in the group, inventories etc.

Figure 3:
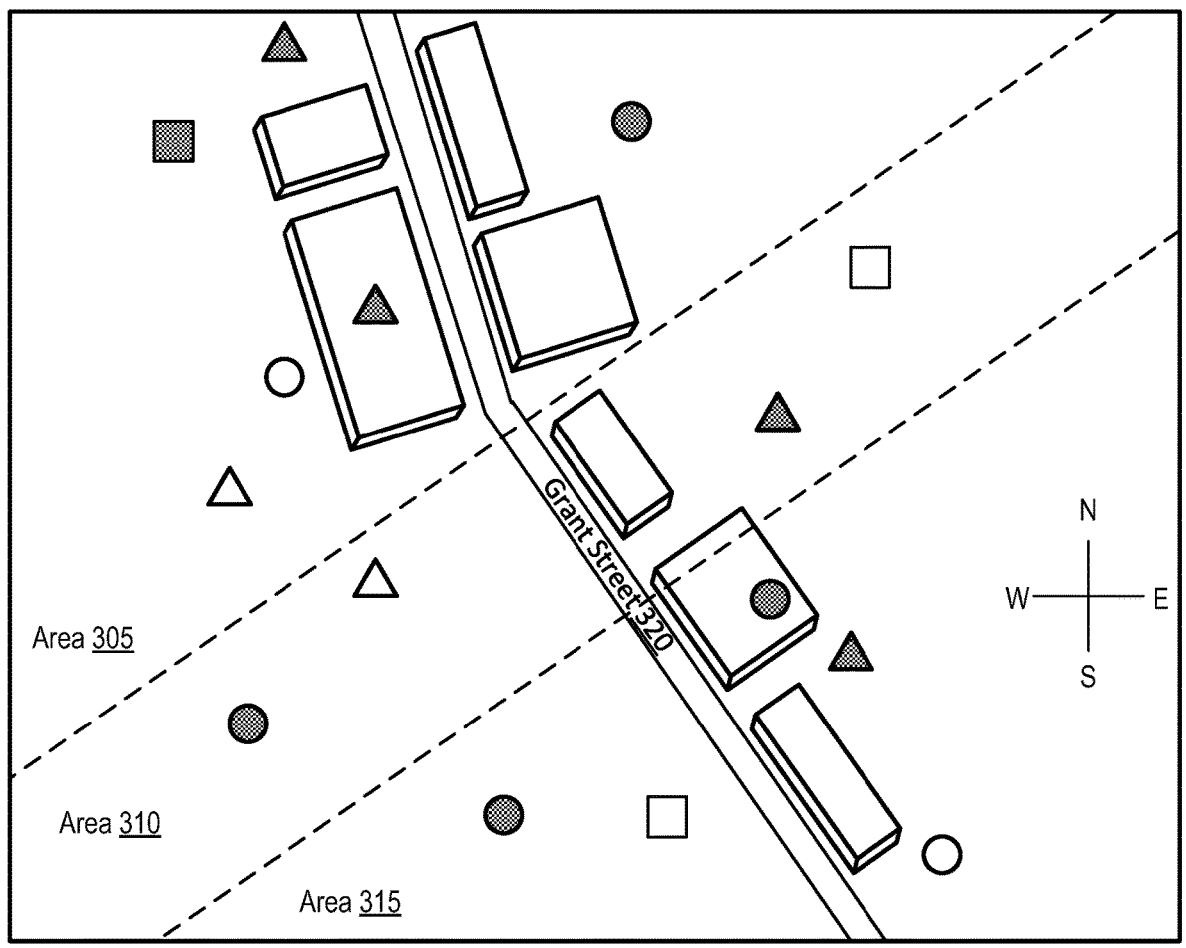
FIG. 3 illustrates a map interface identifying multiple media items sorted based on area into location-based categories and based on icon into device-based categories.

FIG. 3 illustrates a map interface identifying multiple media items sorted based on area into location-based categories and based on icon into device-based categories.

The map 300 of FIG. 3 illustrates a street 320—identified as "Grant Street" alongside which multiple buildings are visible. The map 300 also identifies three areas—a top area 305, a middle area 310, and a bottom area 315. These three areas represent possible location-based categories, as may each of the buildings, and as may the street 320.

The map 300 of FIG. 3 also identifies numerous digital media assets using different shapes to represent different device-based categories and using different colors (grey vs. white) to represent media type categories (photo vs. video). That is, as indicated in the legend 330, the map indicates that a grey square represents a photo captured by a camera capture device, a white square represents a video captured by a camera capture device, a grey triangle represents a photo captured by a UAV capture device, a white triangle represents a video captured by a UAV capture device, a grey circle represents a photo captured by a UGV capture device, and a white circle represents a video captured by a UGV capture device. While other types of digital media assets—such as audio recordings, RADAR images, SONAR images, LIDAR images, and various sensor measurements as discusses herein—are not represented in the exemplary map 300 of FIG. 3, it should be understood that other maps similar to map 300 may include unique indicators corresponding to these other types of digital media assets.

In the map 300 of FIG. 3, area 305 includes two grey triangles, a white triangle, a grey circle, a white circle, and a grey square. Thus, area 305 includes two UAV photos, a UAV video, a UGV photo, a UGV video, and a camera photo. Area 310 includes one grey triangle, one white triangle, a grey circle, and a white square. Thus, area 310 includes one UAV photo, a UAV video, a UGV photo, and a camera video. Area 315 includes one grey triangle, two grey circles, one white circle and a white square. Thus, area 315 includes one UAV photo, two UGV photos, one UGV video, and a camera video.

A map 300 such as the one in FIG. 3 may be generated automatically after data is collected from various data capture devices over a period of time, and may be generated in part by the data capture device(s), a server 525, a viewing client device 535, or some combination thereof.

Figure 4:
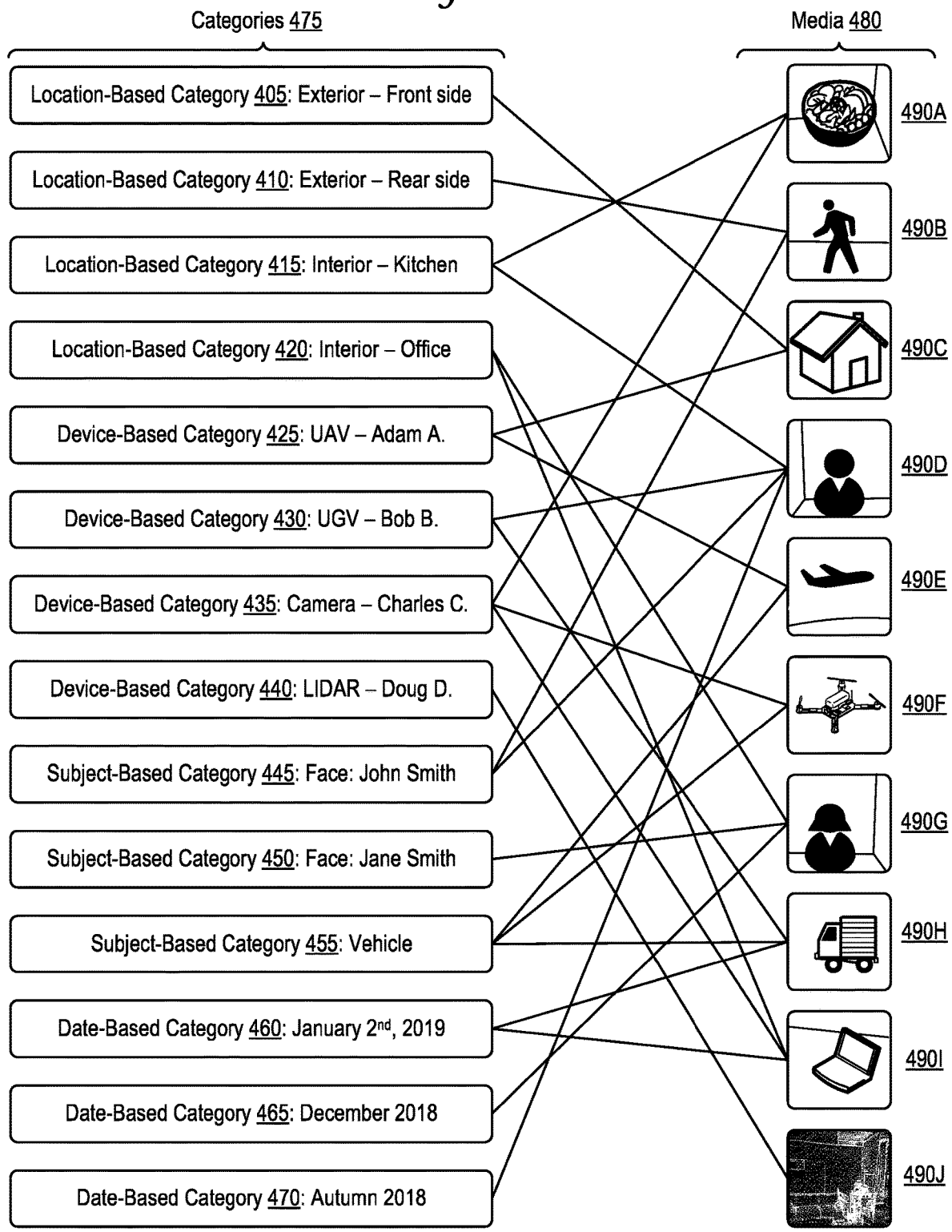
FIG. 4 illustrates various exemplary digital media assets sorted into various exemplary categories based on location, device, subject, and date of capture.

FIG. 4 illustrates various exemplary digital media assets sorted into various exemplary categories based on location, device, subject, and date of capture.

In particular, FIG. 4 illustrates a media set 480 that includes ten exemplary images 490A-J. Each image is categorized into at least one category of a number of categories 475 identified in FIG. 4, which include location-based categories (405, 410, 415, 420), device-based categories (425, 430, 435, 440), subject-based categories (445, 450, 455), and date-based categories (460, 465, 470).

The first image 490A depicts a bowl of salad on a counter, and has been categorized into location-based category 415 ("Interior—Kitchen") corresponding to a kitchen in an interior of a structure, and into a device-based category 435 ("Camera—Charles C.") indicating that the digital media capture device that captured the first image 490A was a camera device belonging to Charles C.

The second image 490B depicts a person walking by a wall, and has been categorized into location-based category 410 ("Exterior—Rear Side") corresponding to a rear side of an exterior of a structure, and into a subject-based category 445 ("Face: John Smith") indicating that the image 490B depicts a face of a person identified as John Smith.

The third image 490C depicts a house from afar, and has been categorized into location-based category 405 ("Exterior—Front Side") corresponding to a front side of an exterior of a structure, and into a device-based category 425 ("UAV—Adam A.") indicating that the digital media capture device that captured the third image 490C was a UAV 105 belonging to Adam A.

The fourth image 490D depicts a male person in a room, and has been categorized into location-based category 415 ("Interior—Kitchen") corresponding to a kitchen in an interior of a structure, into a device-based category 430 ("UGV—Bob B.") indicating that the digital media capture device that captured the fourth image 490D was a UGV 180 belonging to Bob B., into a subject-based category 445 ("Face: John Smith") indicating that the image 490D depicts a face of a person identified as John Smith, and into date-based category 470 ("Autumn 2018") indicating that the image was captured by the media capture device in Autumn of 2018.

The fifth image 490E depicts an airplane from afar, and has been categorized into a device-based category 425 ("UAV—Adam A.") indicating that the digital media capture device that captured the fifth image 490E was a UAV 105 belonging to Adam A. and into subject-based category 455 ("Vehicle") indicating that the image 490E depicts a vehicle.

The sixth image 490F depicts a UAV 105, and has been categorized into a device-based category 435 ("Camera—Charles C.") indicating that the digital media capture device that captured the sixth image 490F was a camera device belonging to Charles C. and into subject-based category 455 ("Vehicle") indicating that the image 490F depicts a vehicle.

The seventh image 490G depicts a female person in a room, and has been categorized into location-based category 420 ("Interior—Office") corresponding to an office in an interior of a structure, into a subject-based category 450 ("Face: Jane Smith") indicating that the image 490G depicts a face of a person identified as Jane Smith, and into date-based category 465 ("December 2018") indicating that the image 490G was captured by the media capture device in December of 2018.

The eighth image 490H depicts a truck, and has been categorized into a device-based category 430 ("UGV—Bob B.") indicating that the digital media capture device that captured eighth image 490H was a UGV 180 belonging to Bob B., into subject-based category 455 ("Vehicle") indicating that the image 490H depicts a vehicle, and into date-based category 460 ("January $2^{nd}$, 2019") indicating that the image 490H was captured by the media capture device on Jan. 2, 2019.

The ninth image 490I depicts a laptop in a room, and has been categorized into location-based category 420 ("Interior—Office") corresponding to an office in an interior of a structure, into a device-based category 435 ("Camera—Charles C.") indicating that the digital media capture device that captured the ninth image 490I was a camera device belonging to Charles C., and into date-based category 460 ("January $2^{nd}$, 2019") indicating that the image 490I was captured by the media capture device on Jan. 2, 2019.

The tenth image 490J depicts a 3D LIDAR image of a room, and has been categorized into device-based category 440 ("LIDAR—Doug D.") indicating that the digital media capture device that captured the tenth image 490J was a LIDAR sensor device belonging to Doug D.

Figure 5:
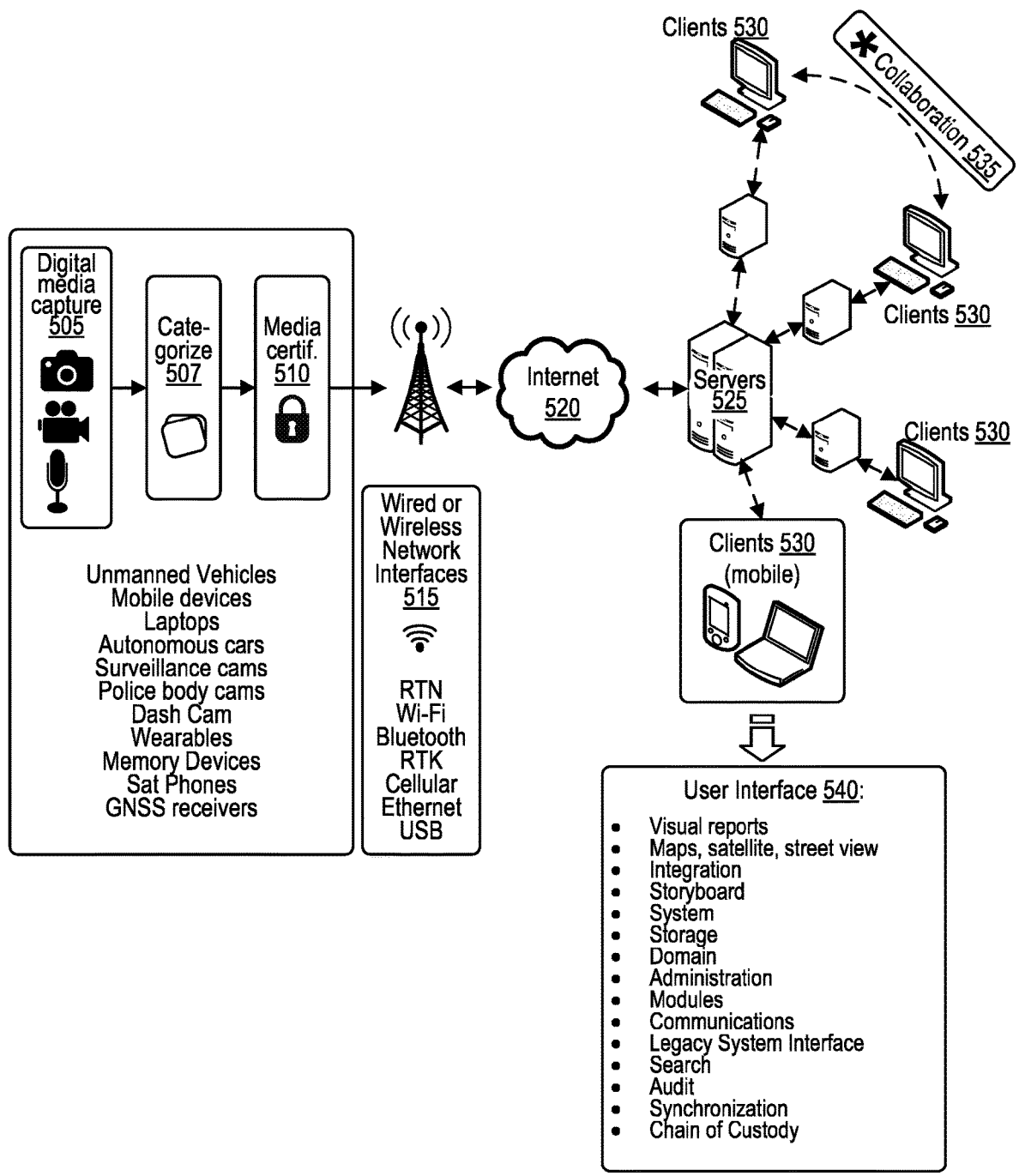
FIG. 5 illustrates a digital media storage and capture architecture.

FIG. 5 illustrates a digital media storage and capture architecture.

The digital media storage and capture architecture of FIG. 5 begins with digital media capture 505, media categorization 507, and media certification 510, each of which may be performed by a number of devices, including but not limited to unmanned and/or autonomous vehicles, mobile devices, smartphones, laptops, surveillance cams, body cameras, dash cam, wearable devices, storage devices, satellite phones, GNSS receivers, computing devices 1300, or combinations thereof. Digital media capture 505 may include capture of image data using still image cameras, capture of video data using video cameras, capture of 360 degree footage using 360 degree cameras, capture of audio using microphones, capture of any other type of media data discussed herein using any other sensor type or combination of sensors discussed herein, or a combination thereof. Media categorization 507 concerns categorizing media into location-based categories, subject-based categories, device-based categories, date-based categories, or other categories, and is described further herein at least at FIG. 4 and FIG. 6. Media certification 510 is described further herein in FIG. 11 and FIG. 12. In some cases, the order of at least the categorization 507 and the media certification 510 steps may be reversed, or certification 510 may occur twice—once to certify the media, and a second time to certify the categorization 507 of the media.

The captured media data, once certified, is then automatically sent through the internet 520 using wired or wireless network interfaces 515 to one or more servers 525 that serve as a cloud storage and application execution engine including media and data sychronization with all mobile/teathered devices. The servers 525 can automatically store and catalogue public keys used in the media certification 510 process, or that task can be shifted to a separate authentication server and/or certificate authority (CA). The servers 525 can establish controls and upload code to the mobile devices, file, convert, verify authenticity using the public key from the media certification 510, and organize the media data in various ways, for example by reading location metadata and grouping images by area (room A in interior of structure, room B in interior of structure, front of exterior of structure, rear of exterior of structure, roof, etc.). The servers 525 can ensure the digital media data is filed, stored and accessed through the web in a systematic or serialized format constant with image identification formed with the image capture device (as seen on the right side of FIG. 5).

The servers 525 can then answer requests from client devices 530 for the certified media data, and may provide the certified media data to the client devices through wired or wireless network interfaces, optionally through other servers. Some clients may then share the certified media data during collaborations 535. Various user interfaces 540 and related functionality may be generated and run on the client devices 530, the servers 525, or some combination thereof, including but not limited to: visual reports, maps, satellite, street view, integration of media together with various documents, storyboarding of media along a timeline, system, storage, domain, administration, modules, communications, legacy system interfaces, searching, filtering, auditing, authenticity verification, source verification, synchronization, chain of custody verification.

In some embodiments, the image capture device can first synchronize its image and/or sensor data with a second device. For example, a camera device (e.g., a digital point-and-shoot camera) may first be required to synchronize its data with a user device such as a smartphone or wearable device, which can then form a connection to the internet/cloud system.

The internet/cloud system 525 can include one or more server systems 525, which may be connected to each other. In one embodiment, this internet/cloud system is a wireless multiplexed system for securely storing digital data to and from mobile digital devices. In another embodiment, the digital data (e.g., images, reports) are securely held in one central place, either by a hardware memory device, server, or a data center. Once the data is in the internet/cloud system 525, it may be accessible through a web portal. This web portal may include image-editing tools, worldwide access, and collaboration mechanisms available to its users. Security, digital signature, watermarking, encryption physical access, password credentials area can be utilized throughout the system. Original digital media asset data can be confirmed, saved, preserved, and protected though various technologies and system controls.

In some cases, certain functions identified here as occurring at least partially at the digital media capture device—such as the media categorization 507 and/or the media certification 510—may occur at least partially elsewhere, such as at the servers 525, at the clients 530, or some combination thereof.

Figure 6:
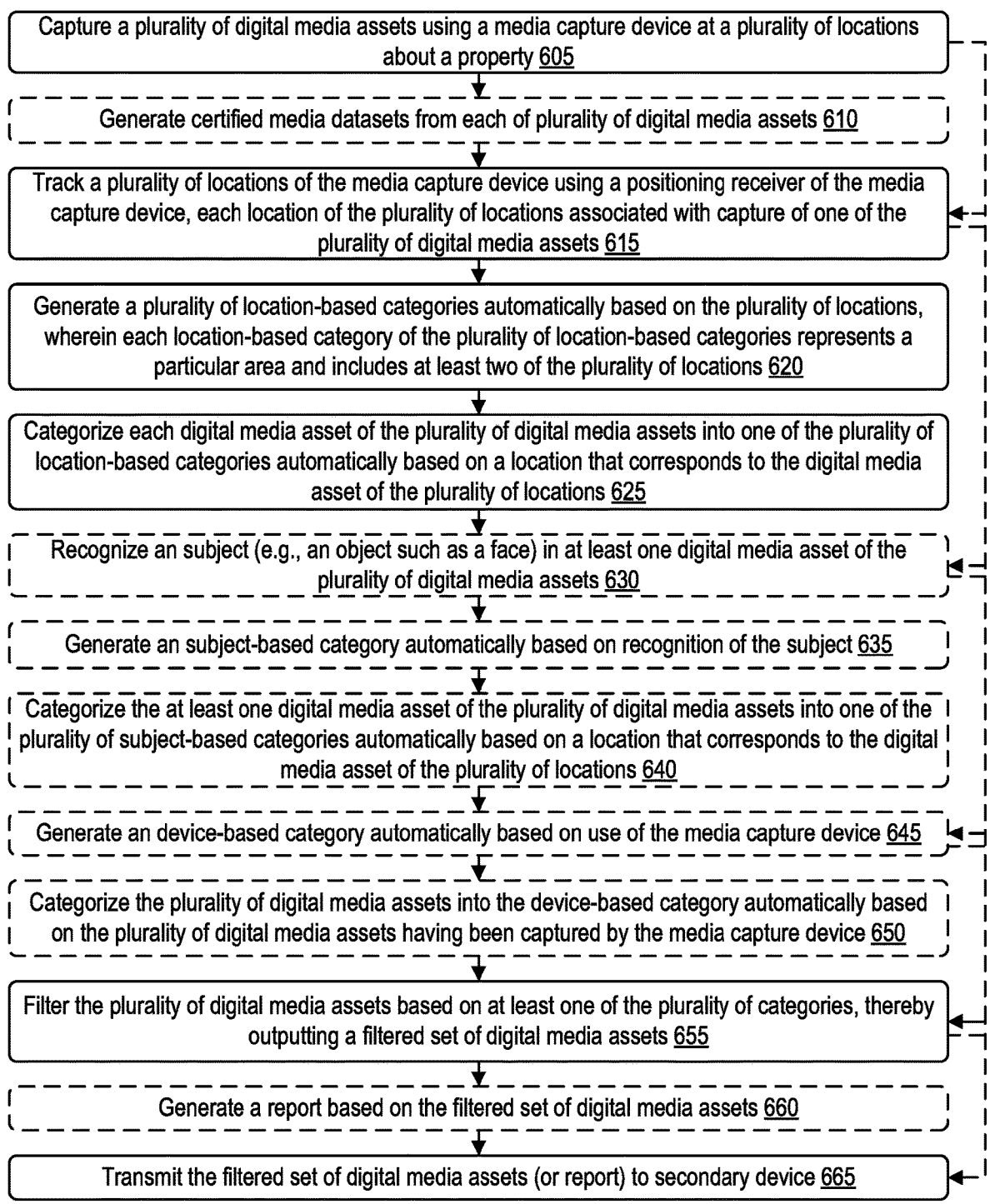
FIG. 6 is a flow diagram illustrating operations for location-based media capture tracking.

FIG. 6 is a flow diagram illustrating operations for location-based media capture tracking.

Step 605 involves capturing a plurality of digital media assets using a media capture device at a plurality of locations about a property.

Optional step 610 involves generating certified media datasets from each of plurality of digital media assets.

Step 615 involves tracking a plurality of locations of the media capture device using a positioning receiver of the media capture device, each location of the plurality of locations associated with capture of one of the plurality of digital media assets.

Step 620 involves generating a plurality of location-based categories automatically based on the plurality of locations, wherein each location-based category of the plurality of location-based categories represents a particular area and includes at least two of the plurality of locations.

Step 625 involves categorizing each digital media asset of the plurality of digital media assets into one of the plurality of location-based categories automatically based on a location that corresponds to the digital media asset of the plurality of locations.

Optional step 630 involves recognizing an subject (e.g., an object such as a face) in at least one digital media asset of the plurality of digital media assets.

Optional step 635 involves generating an subject-based category automatically based on recognition of the subject.

Optional step 640 involves categorizing the at least one digital media asset of the plurality of digital media assets into one of the plurality of subject-based categories automatically based on a location that corresponds to the digital media asset of the plurality of locations.

Optional step 645 involves generating an device-based category automatically based on use of the media capture device.

Optional step 650 involves categorizing the plurality of digital media assets into the device-based category automatically based on the plurality of digital media assets having been captured by the media capture device.

Figure 10:
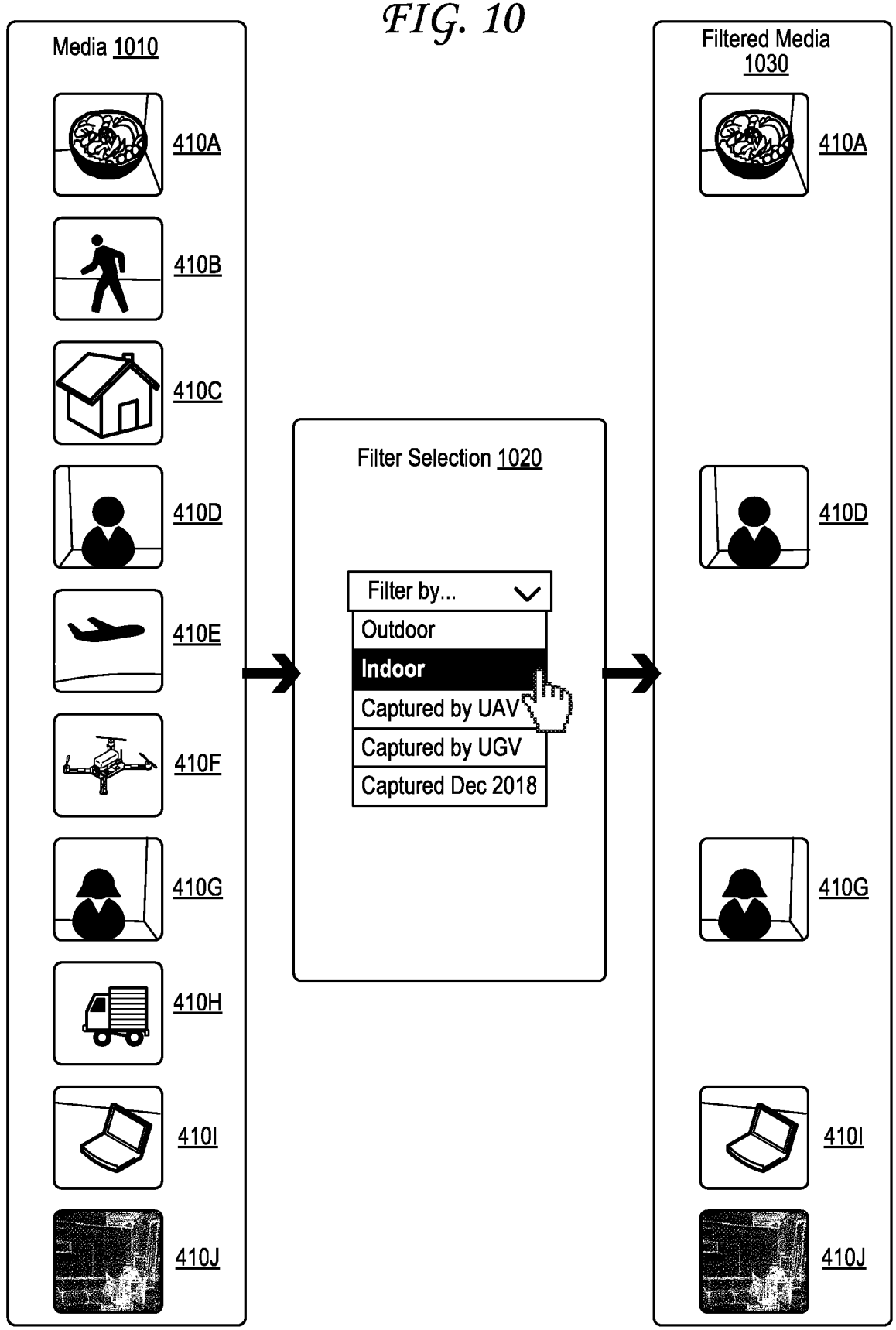
FIG. 10 illustrates a media filtering procedure performed based on a filter selection.

Step 655 involves filtering the plurality of digital media assets based on at least one of the plurality of categories, thereby outputting a filtered set of digital media assets. An example of such filtering is illustrated in FIG. 10.

Optional step 660 involves generating a report based on the filtered set of digital media assets. Reports may be associated with incidents—such as incidents in which properties were damaged—which in turn may be categorized by incident type, such as floods, fires, tornadoes, earthquakes, tsunamis, landslides, avalanches, volcanic eruptions, storms, sinkholes, limnic eruptions, blizzards, hailstorms, ice storms, cold snaps, heat waves, droughts, lightning strikes, meteor impacts, solar flares, other natural disasters, car accidents, other vehicle accidents, pollution damage, electrical malfunctions, power plant malfunctions or meltdowns, other artificial or manmade disasters, or combinations thereof. Reports may include filtered data showing the type of damage that might typically result from the incident about which the report is meant to describe or document. Reports may also include generated layouts of properties, such as the generated layout 195 of FIG. 1C or the generated layout 290 of FIG. 2C. Reports may also include generated maps, such as the generated map 300 of FIG. 3.

Step 665 involves transmitting the filtered set of digital media assets (or report) to secondary device. In some cases, report generation of step 660 may occur after filtering, or may be the impetus for filtering in step 655 by automatically triggering filtering based on media showing a type of damage that might typically result from the incident about which the report is meant to describe or document. For instance, if the report is an incident report documenting a flood, the filtering may be set to show media depicting or otherwise showing water damage, which may include for example images of water damages, video of water flowing, audio of interviews with owners of damaged properties, moisture and humidity sensor readings, and the like. If the report is an incident report documenting a fire or lightning strike, the filtering may be set to show media depicting or otherwise showing fire or electrical damage. Reports may also include textual or audio descriptions of the incidents that they are documenting, and may include metadata such as dates of preparation, author listings, and so forth. Reports themselves, like the media assets within the reports, may be certified according to the processes outlined in FIG. 11 and FIG. 12.

The system collects media categories and creates intelligence about the media, including its environment, security, location, elevation, distance to media subject matter or objects in the media, orientation and certification. Chain of custody is initiated simultaneously when the digital device is triggered, to capture a single or group of media. Once media and media intelligence is captured via user selectable controls, manual and automatic parameters from a software user controlled selectable list and media is automatically transmitted to a cloud within secure means. The "media intelligence" is made up of geo-location, metadata media attributes, including security, user identification, device name, model identification, serial number, date, time, UTC, DST, minutes/seconds, group titles, labels, individual media asset titles, media annotation, elevation in meters/feet from sea level, title, categories, comments, notes, device orientation at instant of trigger capture, 2D or 3D GPS data, compass heading reference readout on screen, degrees difference from active true north indicator, symbolic true north indicator, instantaneous continuous compass degree readout, selectable pictorial street map/satellite map/street view media with actual media pin location that displays within the digital media asset(s) upon touching the on-screen indicator (e.g., pin), 2D view, 3D view, latitude/longitude screen lettering, acceleration direction and speed indicators, authentication, media certification, and grouping/arraigning/classifying and categorization of digital media and transmission of both the media and media intelligence to a cloud system where the media is stored in the groups as established by the remote digital capture device upon device trigger. The server 525 may further confirm receipt of the media and may itself verify the certificiation using the public key and confirm successful verification. Syncronization of media, data and media intelligence may be completed in response to selectable controls, including manual and automatic controls.

FIG. 7A illustrates an unmanned aerial vehicle (UAV).

UAV 105 can have one or more motors 750 configured to rotate attached propellers 755 in order to control the position of UAV 105 in the air. UAV 105 can be configured as a fixed wing vehicle (e.g., airplane), a rotary vehicle (e.g., a helicopter or multirotor), or a blend of the two.

For the purpose of FIG. 7A, axes 775 can assist in the description of certain features and their relative orientations. If UAV 105 is oriented parallel to the ground, the Z axis can be the axis perpendicular to the ground, the X axis can generally be the axis that passes through the bow and stern of UAV 105, and the Y axis can be the axis that pass through the port and starboard sides of UAV 105. Axes 775 are merely provided for convenience of the description herein.

In some embodiments, UAV 105 has main body 710 with one or more arms 740. The proximal end of arm 740 can attach to main body 710 while the distal end of arm 740 can secure motor 750. Arms 740 can be secured to main body 710 in an "X" configuration, an "H" configuration, a "T" configuration, a "Y" configuration, or any other configuration as appropriate. The number of motors 750 can vary, for example there can be three motors 750 (e.g., a "tricopter"), four motors 750 (e.g., a "quadcopter"), eight motors (e.g., an "octocopter"), etc.

In some embodiments, each motor 755 rotates (i.e., the drive shaft of motor 755 spins) about parallel axes. For example, the thrust provided by all propellers 755 can be in the Z direction. Alternatively, a motor 755 can rotate about an axis that is perpendicular (or any angle that is not parallel) to the axis of rotation of another motor 755. For example, two motors 755 can be oriented to provide thrust in the Z direction (e.g., to be used in takeoff and landing) while two motors 755 can be oriented to provide thrust in the X direction (e.g., for normal flight). In some embodiments, UAV 105 can dynamically adjust the orientation of one or more of its motors 750 for vectored thrust.

In some embodiments, the rotation of motors 750 can be configured to create or minimize gyroscopic forces. For example, if there are an even number of motors 750, then half of the motors can be configured to rotate counter-clockwise while the other half can be configured to rotate clockwise. Alternating the placement of clockwise and counter-clockwise motors can increase stability and enable UAV 105 to rotate about the z-axis by providing more power to one set of motors 750 (e.g., those that rotate clockwise) while providing less power to the remaining motors (e.g., those that rotate counter-clockwise).

Motors 750 can be any combination of electric motors, internal combustion engines, turbines, rockets, etc. In some embodiments, a single motor 750 can drive multiple thrust components (e.g., propellers 755) on different parts of UAV 105 using chains, cables, gear assemblies, hydraulics, tubing (e.g., to guide an exhaust stream used for thrust), etc. to transfer the power.

In some embodiments, motor 750 is a brushless motor and can be connected to electronic speed controller X45. Electronic speed controller 745 can determine the orientation of magnets attached to a drive shaft within motor 750 and, based on the orientation, power electromagnets within motor 750. For example, electronic speed controller 745 can have three wires connected to motor 750, and electronic speed controller 745 can provide three phases of power to the electromagnets to spin the drive shaft in motor 750. Electronic speed controller 745 can determine the orientation of the drive shaft based on back-end on the wires or by directly sensing to position of the drive shaft.

Transceiver 765 can receive control signals from a control unit (e.g., a handheld control transmitter, a server, etc.). Transceiver 765 can receive the control signals directly from a control unit 800 or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 765 can also transmit data to a control unit 800. Transceiver 765 can communicate with the control unit using lasers, light, ultrasonic, infra-red, Bluetooth, 802.11x, or similar communication methods, including a combination of methods. Transceiver can communicate with multiple control units 800 at a time. The transceiver 765 can also be used to send media data captured by the camera 705 and/or other sensors of the UAV 105 to a secondary device, such as a server 525 or client 530, either before or after media certification 510.

Position sensor 735 can include an inertial measurement unit (IMU) or inertial navigation system (INS) for determining the acceleration and/or the angular rate of UAV 105 using one or more accelerometers and/or gyroscopes, a GPS receiver for determining the geolocation and altitude of UAV 105, a magnetometer for determining the surrounding magnetic fields of UAV 105 (for informing the heading and orientation of UAV 105), a barometer for determining the altitude of UAV 105, etc. Position sensor 735 can include a land-speed sensor, an air-speed sensor, a celestial navigation sensor, etc.

UAV 105 can have one or more environmental awareness sensors. These sensors can use sonar, SODAR or SODAR transmitters or receivers or transceivers, LiDAR transmitters or receivers or transceivers, stereoscopic imaging, a synthetic aperture radar (SAR) transmitters or receivers or transceivers, and ground penetrating radar (GPR) transmitters or receivers or transceivers, to determine items located underground and creating a target location and position, cameras paired with computer vision algorithms executed by a processor, and combinations thereof, both to capture media to determine and analyze the nearby environment (e.g., property 110) and to detect and avoid obstacles. For example, a collision and obstacle avoidance system can use environmental awareness sensors to determine how far away an obstacle is and, if necessary, change course.

Position sensor 735 and environmental awareness sensors can all be one unit or a collection of units. In some embodiments, some features of position sensor 735 and/or the environmental awareness sensors are embedded within flight controller 730. Readings from these sensors may be used in the metadata for individual digital media assets captured by the UAV 105 or other unmanned vehicle.

In some embodiments, an environmental awareness system can take inputs from position sensors 735, environmental awareness sensors, databases (e.g., a predefined mapping of a region) to determine the location of UAV 105, obstacles, and pathways. In some embodiments, this environmental awareness system is located entirely on UAV 105, alternatively, some data processing can be performed external to UAV 105.

Camera 705 can include an image sensor (e.g., a CCD sensor, a CMOS sensor, etc.), a lens system, a processor, etc. The lens system can include multiple movable lenses that can be adjusted to manipulate the focal length and/or field of view (i.e., zoom) of the lens system. In some embodiments, camera 705 is part of a camera system which includes multiple cameras 705. For example, two cameras 705 can be used for stereoscopic imaging (e.g., for first person video, augmented reality, etc.). Another example includes one camera 705 that is optimized for detecting hue and saturation information and a second camera 705 that is optimized for detecting intensity information. In some embodiments, camera 705 optimized for low latency is used for control systems while a camera 705 optimized for quality is used for recording a video (e.g., a cinematic video). Camera 705 can be a visual light camera, an infrared camera, a depth camera, etc.

A gimbal and dampeners can help stabilize camera 705 and remove erratic rotations and translations of UAV 105. For example, a three-axis gimbal can have three stepper motors that are positioned based on a gyroscope reading in order to prevent erratic spinning and/or keep camera 705 level with the ground. Alternatively, image stabilization can be performed digitally using a combination of motion flow vectors from image processing and data from inertial sensors such as accelerometers and gyros.

Video processor 725 can process a video signal from camera 705. For example video process 725 can enhance the image of the video signal, down-sample or up-sample the resolution of the video signal, add audio (captured by a microphone) to the video signal, overlay information (e.g., flight data from flight controller 730 and/or position sensor), convert the signal between forms or formats, etc.

Video transmitter 720 can receive a video signal from video processor 725 and transmit it using an attached antenna. The antenna can be a cloverleaf antenna or a linear antenna. In some embodiments, video transmitter 720 uses a different frequency or band than transceiver 765. In some embodiments, video transmitter 720 and transceiver 765 are part of a single transceiver. The video transmitter 720 can also send media data captured from any other sensor of the UAV 105, before or after media certification 510. The video transmitter 720 can optionally be merged into the transceiver 765.

Battery 770 can supply power to the components of UAV 105. A battery elimination circuit can convert the voltage from battery 770 to a desired voltage (e.g., convert 12 v from battery 770 to 5 v for flight controller 730). A battery elimination circuit can also filter the power in order to minimize noise in the power lines (e.g., to prevent interference in transceiver 765 and transceiver 720). Electronic speed controller 745 can contain a battery elimination circuit. For example, battery 770 can supply 12 volts to electronic speed controller 745 which can then provide 5 volts to flight controller 730. In some embodiments, a power distribution board can allow each electronic speed controller (and other devices) to connect directly to the battery.

In some embodiments, battery 770 is a multi-cell (e.g., 2S, 3S, 4S, etc.) lithium polymer battery. Battery 770 can also be a lithium-ion, lead-acid, nickel-cadmium, or alkaline battery. Other battery types and variants can be used as known in the art. Additional or alternative to battery 770, other energy sources can be used. For example, UAV 105 can use solar panels, wireless or inductive power transfer, a tethered power cable (e.g., from a ground station or another UAV 105), etc. In some embodiments, the other energy source can be utilized to charge battery 770 while in flight or on the ground.

Battery 770 can be securely mounted to main body 710. Alternatively, battery 770 can have a release mechanism. In some embodiments, battery 770 can be automatically replaced. For example, UAV 105 can land on a docking station and the docking station can automatically remove a discharged battery 770 and insert a charged battery 770. In some embodiments, UAV 105 can pass through a docking station and replace battery 770 without stopping.

Battery 770 can include a temperature sensor for overload prevention. For example, when charging, the rate of charge can be thermally limited (the rate will decrease if the temperature exceeds a certain threshold). Similarly, the power delivery at electronic speed controllers 745 can be thermally limited—providing less power when the temperature exceeds a certain threshold. Battery 770 can include a charging and voltage protection circuit to safely charge battery 770 and prevent its voltage from going above or below a certain range.

UAV 105 can include a location transponder. For example, in a property surveying environment, a property surveyor can track the UAV 105's position about the property using location transponder including ADS-B in and out. The actual location (e.g., X, Y, and Z) can be tracked using triangulation of the transponder. In some embodiments, gates or sensors in a track can determine if the location transponder has passed by or through the sensor or gate.

Flight controller 730 can communicate with electronic speed controller 745, battery 770, transceiver 765, video processor 725, position sensor 735, and/or any other component of UAV 105. In some embodiments, flight controller 730 can receive various inputs (including historical data) and calculate current flight characteristics. Flight characteristics can include an actual or predicted position, orientation, velocity, angular momentum, acceleration, battery capacity, temperature, etc. of UAV 105. Flight controller 730 can then take the control signals from transceiver 765 and calculate target flight characteristics. For example, target flight characteristics might include "rotate x degrees" or "go to this GPS location". Flight controller 730 can calculate response characteristics of UAV 105. Response characteristics can include how electronic speed controller 745, motor 750, propeller 755, etc. respond, or are expected to respond, to control signals from flight controller 730. Response characteristics can include an expectation for how UAV 105 as a system will respond to control signals from flight controller 730. For example, response characteristics can include a determination that one motor 750 is slightly weaker than other motors.

After calculating current flight characteristics, target flight characteristics, and response characteristics flight controller 730 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 730 are performed by a system external to UAV 105. For example, current flight characteristics can be sent to a server that returns the optimized control signals. Flight controller 730 can send the optimized control signals to electronic speed controllers 745 to control UAV 105.

In some embodiments, UAV 105 has various outputs that are not part of the flight control system. For example, UAV 105 can have a loudspeaker for communicating with people or other UAVs 105. Similarly, UAV 105 can have a flashlight or laser. The laser can be used to "tag" another UAV 105.

The UAV 105 may have many sensors, such as the camera 705, for producing visual data, including video cameras and still image cameras that operate in the visual spectrum and/or other electromagnetic spectra, such as infrared, ultraviolet, radio, microwave, x-ray, or any subset or combination thereof. The UAV 105 may have positioning sensors, including one or more Global Navigation Satellite System (GNSS) receivers such as Global Positioning System (GPS) receivers, Glonass receivers, Beidou receivers, and Galileo receivers, optionally with real time kinematics (RTK) differential GNSS corrections such as Radio Technical Commission for Maritime Services (RTCM) or Compact Measurement Record (CMR).

FIG. 7B illustrates an unmanned ground vehicle (UGV). The UGV 180 of FIG. 7B can include any of the components identified with respect to the UAV 105 of FIG. 7A, including but not limited to the camera 705, transceiver 765, video transmitter 720, RADAR transceivers, LiDAR or EmDAR transceivers, SONAR or SODAR transceivers, laser rangefinders, GPR transceivers, SAR transceivers, or combinations thereof. The UGV 180 also includes one or more wheels 780, which the UGV 180 actuates with electric or gasoline-powered motors to guide the UGV 180 along a path or route. The UGV 180 may have any combination of any of the sensors discussed with regard to FIG. 7A with respect to the UAV 105.

While FIG. 7A and FIG. 7B illustrate a UAV 105 and UGV 180 respectively, it should be understood that any USVs and UUVs used for property analysis may include the same types of sensors and other hardware discussed with respect to the UAV 105 and UGV 180.

Figure 8:
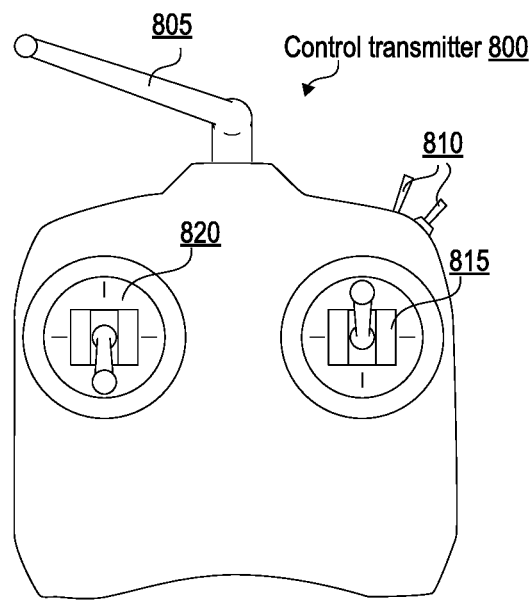
FIG. 8 illustrates a control device for an unmanned vehicle.

FIG. 8 illustrates a control device for an unmanned vehicle.

Control transmitter 800 can send control signals to transceiver 765. Control transmitter can have auxiliary switches 810, joysticks 815 and 820, and antenna 805. Joystick 815 can be configured to send elevator and aileron control signals while joystick 820 can be configured to send throttle and rudder control signals (this is termed a mode 2 configuration). Alternatively, joystick 815 can be configured to send throttle and aileron control signals while joystick 820 can be configured to send elevator and rudder control signals (this is termed a mode 1 configuration). Auxiliary switches 810 can be configured to set options on control transmitter 800 or UAV 105. In some embodiments, control transmitter 800 receives information from a transceiver on UAV 105 or UGV 180. For example, it can receive captured media or some current flight or drive characteristics from UAV 105 or UGV 180. Control transmitter can also use an autopilot function to fly a previously prepared flight plan including sensor target details to collection and automatically return to a predetermined or adjusted location on completion. UAV 105 or UGV 180 may be electronically coupled to central command and control center such as 520 or 525 for overall system management either directly or through the cloud system.

FIG. 9 illustrates a head-mounted display for viewing media captured by an unmanned vehicle or other media capture device.

Display 900 can include battery 905 or another power source, display screen 910, and receiver 915. Display 900 can receive a video stream from transmitter 720 from UAV 100. Display 900 can be a head-mounted unit as depicted in FIG. 9. Display 900 can be a monitor such that multiple viewers can view a single screen. In some embodiments, display screen 910 includes two screens, one for each eye; these screens can have separate signals for stereoscopic viewing. In some embodiments, receiver 915 is mounted on display 900 (as shown in FIG. 9), alternatively, receiver 915 can be a separate unit that is connected using a wire to display 900. In some embodiments, the display screen 910 may be transparent or translucent so that any images, video, or data output by the display are overlayed over a view through the transparent or translucent lens to produce an augmented reality effect. In some embodiments, the head-mounted display 900 may include a camera that can capture images or video corresponding to the view that would be visible by the wearer if not for the display screen 910, and may then output those images or that video to the display 910, optionally after passing those images or that video through a filter, inserting other media, or otherwise modifying the images or video to produce an augmented reality effect. The display 900 may be used, for example, for a virtual reality walkthrough of the generated layout 195 or 290, or an augmented reality walkthrough of a property 110 or structure 120 or 220 during which media collected—or portions of the generated layout 195 or 290—may pop up on the display 900 at appropriate locations, such as those latitude and longitude coordinates—and heading/direction/inclinations/altitudes—marked with reference images in the generated layouts 195 or 290. In some embodiments, display 900 is coupled to control transmitter 800.

FIG. 10 illustrates a media filtering procedure performed based on a filter selection.

A set of media assets 1010 is identified, including images 410A-J previously identified in FIG. 4. These may be certified images stored at the server 525, or may be images (certified or not) still at the digital media capture device.

A filter selection 1020 is made, either automatically (e.g., based on what is determined to be needed to generate a particular report) or based on a user input. In the example filter selection 1020 illustrated in FIG. 10, location-based category "Indoor" is selected, while unselected categories include location-based category "Outdoor," device-based category "Captured by UAV," device-based category "Captured by UGV," and date-based category "Captured December 2018." The filter selection 1020 may be received by server 525 from client device 530, or may be automatically generated by server 525, or may be made (automatically or based on user input) at the media capture device.

As a result of the filter selection 1020, a filtered media set 1030 is generated and output by the server 525 and/or digital media capture device. In the example of FIG. 10, the filter selection 1020 represents a whitelist, meaning only media matching the category selected in the filter selection 1020 is output in the filtered media set 1030. Thus, image 410A of the salad in the kitchen, image 410D of Jon Smith in the kitchen, image 410G of Jane Smith in the office, image 410I of the laptop in the office, and LIDAR image 410J of an indoor room result. In some cases, multiple categories may be selected in the filter selection 1020, with the media in the filtered media 1030 either required to match all selected categories or any of the selected categories.

In some cases, the filter selection 1020 may represent a blacklist rather than a whitelist, meaning that media matching any categories selected in the filter selection 1020 will not appear in the filtered media set 1030.

Figure 11:
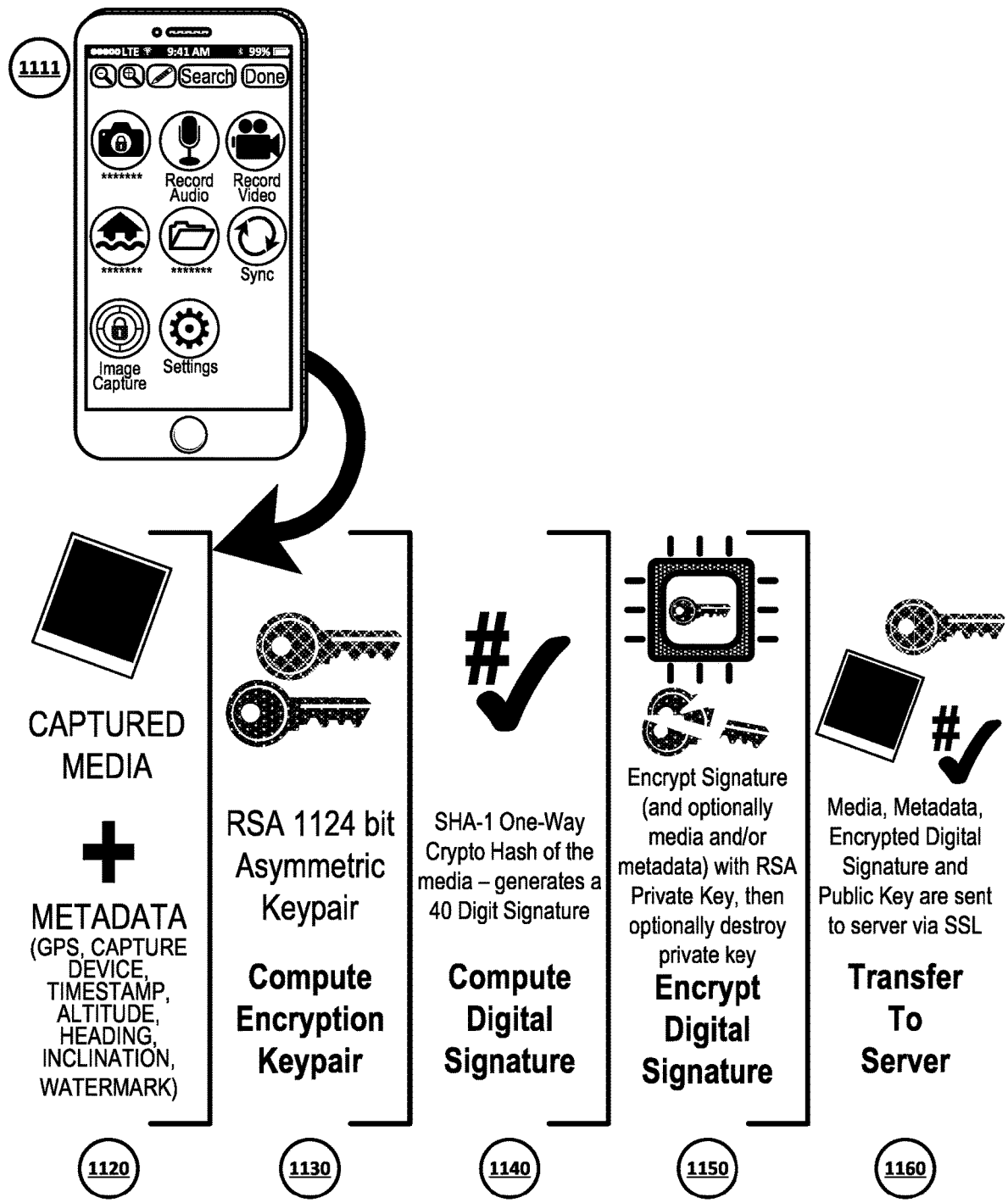
FIG. 11 illustrates security certification of digital media for verification of authenticity.

FIG. 11 illustrates security certification of digital media for verification of authenticity.

At step 1110, media is captured by a media capture device, which may be a mobile device as illustrated in FIG. 11, a UAV 105 or UGV 180 or USV or UUV as discussed above, or any other device discussed herein. At step 1120, the captured media and its corresponding metadata are gathered and converted to an appropriate format if necessary, the metadata including, for example, latitude and longitude coordinates from a GNSS receiver or other positioning receiver, an identification of the media capture device, a timestamp identifying date and time and optionally time zone of capture, an altitude at capture, a heading at capture, an inclination at capture, a yaw at capture, a roll at capture, a watermark, any other data that might be found in image EXIF metadata, or combinations thereof. In some cases, the media at steps 1110 and 1120 may also include media that has been generated, such as the categorizations 507 of FIG. 5 or the generated layout 195 of FIG. 1C or the generated layout 290 of FIG. 2C.

At step 1130, an asymmetric public key infrastructure (PKI) key pair—with a private key and a corresponding public key—are generated, either by the media capture device of step 1110 or by server 525. These may be RSA 1024 asymmetric keys.

At step 1140, a digital signature is computed by generating a hash digest—optionally using a secure hash algorithm such as SHA-0, SHA-1, SHA-2, or SHA-3—of the captured media, and optionally of the metadata as well. At step 1150, the digital signature is encrypted with the private key. The media asset and the metadata may also optionally be encrypted via the private key. The private key is optionally destroyed. At step 1160, the captured media—either encrypted or not—is transferred to the servers 525 along with the encrypted digital signature and the metadata, which may also be either encrypted or not. The public key may also be transferred to the servers 525 along with these, or they may be published elsewhere.

In some embodiments, these data integrity precautions can include securing all non-asset data can in a local database with a globally unique identifier to ensure its integrity. The asset's security and integrity can be ensured via a Digital Signature that is made up of a (optionally secure) hash digest, such as an SHA-1 or SHA-2 or SHA-3 or SHA-4 or SHA-5 or SHA-6, the time that the asset was captured and the device of origin. This allows the mobile app or server to detect changes due to storage or transmission errors as well as any attempt to manipulate or change the content of the asset. The digital signature can be encrypted with a private key of a public/private key-pair that was generated uniquely for that asset. The media and/or metadata may also be encrypted using the private key. The private key can be destroyed and/or never written to disk or stored in memory; as such, this ensures that the asset cannot be re-signed or changed in a way that cannot be tracked. The public key can be published and made accessible to anyone wishing to verify authenticity of the media by decrypting the media and/or metadata and/or digital signature.

Figure 12:
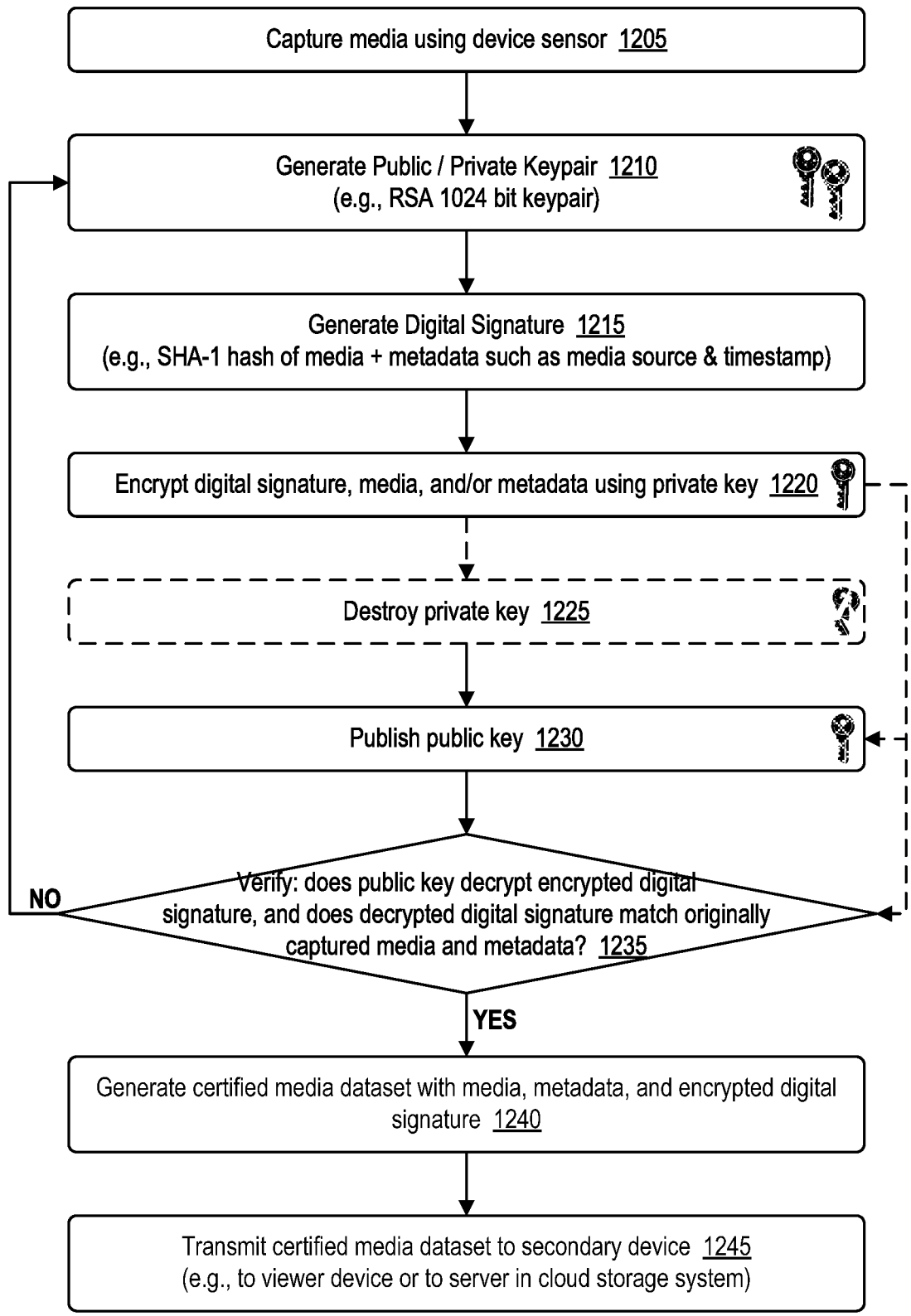
FIG. 12 is a flow diagram illustrating an exemplary method for security certification and verification of digital media.

FIG. 12 is a flow diagram illustrating an exemplary method for security certification and verification of digital media.

At step 1205, media is captured by a media capture device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, a watermark, any other data that might be found in image EXIF metadata, or combinations thereof. In some cases, the media at step 1205 may also include media that has been generated, such as the categorizations 507 of FIG. 5 or the generated layout 195 of FIG. 1C or the generated layout 290 of FIG. 2C.

At step 1210, an asymmetric public key infrastructure (PKI) key pair—with a private key and a corresponding public key—is generated by the media capture device of step 1205 or by server 525. These may be RSA 1024 asymmetric keys.

At step 1215, a digital signature is computed by generating a hash digest—optionally using a secure hash algorithm such as SHA-0, SHA-1, SHA-2, or SHA-3—of the captured media, and optionally of the metadata as well. At step 1220, the digital signature is encrypted with the private key. The media and/or metadata may also be encrypted using the private key. The private key is optionally destroyed at step 1225, or may be never be written to non-volatile memory in the first place.

At step 1230, the public key is published, either by sending it to the servers 525, to an authentication server such as a certificate authority, or by otherwise sending it for publication in another publically accessible and trusted network location. At step 1235, verification as to the authenticity of the media and metadata may occur by decrypting the encrypted digital signature using the public key before or after publication at step 1230, and verifying whether or not the hash digest stored as part of the decrypted digital signature matches a newly generated hash digest of the media. The same can be done using the metadata if a hash digest of the metadata is included in the digital signature. The verification as to the authenticity of the media and metadata at step 1235 may also include decrypting the media asset and/or the metadata itself, if either or both were encrypted at step 1220. This verification may occur at the digital media capture device—though it may instead or additionally be performed at the server 525, for example before the server 525 indexes the media as part of a cloud storage system accessible by client devices 530.

Assuming the authentication of step 1235 was successful, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At step 1245, the certified media dataset (and optionally the public key) is transmitted to a secondary device, such as a server 525 or a viewer device (i.e., a client device 530).

FIG. 13 is a block diagram of an exemplary computing device that may be used to implement some aspects of the technology. FIG. 13 illustrates an exemplary computing system 1300 that may be used to implement some aspects of the technology. For example, any of the computing devices, computing systems, network devices, network systems, servers, and/or arrangements of circuitry described herein may include at least one computing system 1300, or may include at least one component of the computer system 1300 identified in FIG. 13. The computing system 1300 of FIG. 13 includes one or more processors 1310 and memory 1320. Each of the processor(s) 1310 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1310 may include one or more cores, either integrated onto a single chip or spread across multiple chips connected or coupled together. Memory 1320 stores, in part, instructions and data for execution by processor 1310. Memory 1320 can store the executable code when in operation. The system 1300 of FIG. 13 further includes a mass storage device 1330, portable storage medium drive(s) 1340, output devices 1350, user input devices 1360, a graphics display 1370, and peripheral devices 1380.

The components shown in FIG. 13 are depicted as being connected via a single bus 1390. However, the components may be connected through one or more data transport means. For example, processor unit 1310 and memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive or an optical disk drive, is a non-volatile storage device for storing data and instructions for use by processor unit 1310. Mass storage device 1330 can store the system software for implementing some aspects of the subject technology for purposes of loading that software into memory 1320.

Portable storage device 1340 operates in conjunction with a portable non-volatile storage medium, such as a floppy disk, compact disk or Digital video disc, to input and output data and code to and from the computer system 1300 of FIG. 13. The system software for implementing aspects of the subject technology may be stored on such a portable medium and input to the computer system 1300 via the portable storage device 1340.

The memory 1320, mass storage device 1330, or portable storage 1340 may in some cases store sensitive information, such as transaction information, health information, or cryptographic keys, and may in some cases encrypt or decrypt such information with the aid of the processor 1310. The memory 1320, mass storage device 1330, or portable storage 1340 may in some cases store, at least in part, instructions, executable code, or other data for execution or processing by the processor 1310.

Output devices 1350 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1370. The printer may be inkjet, laserjet, thermal, or some combination thereof. In some cases, the output device circuitry 1350 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, cellular data network wireless signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Output devices 1350 may include any ports, plugs, antennae, wired or wireless transmitters, wired or wireless transceivers, or any other components necessary for or usable to implement the communication types listed above, such as cellular Subscriber Identity Module (SIM) cards.

Input devices 1360 may include circuitry providing a portion of a user interface. Input devices 1360 may include an alpha-numeric keypad, such as a keyboard, for inputting alpha-numeric and other information, or a pointing device, such as a mouse, a trackball, stylus, or cursor direction keys. Input devices 1360 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, 802.11 Wi-Fi wireless signal transfer, wireless local area network (WAN) signal transfer, cellular data network wireless signal transfer, personal area network (PAN) signal transfer, wide area network (WAN) signal transfer, a radio wave signal transfer, a microwave signal transfer, an infrared signal transfer, a visible light signal transfer, an ultraviolet signal transfer, a wireless signal transfer along the electromagnetic spectrum, or some combination thereof. Input devices 1360 may include any ports, plugs, antennae, wired or wireless receivers, wired or wireless transceivers, or any other components necessary for or usable to implement the communication types listed above, such as cellular SIM cards.

Input devices 1360 may include receivers or transceivers used for positioning of the computing system 1300 as well. These may include any of the wired or wireless signal receivers or transceivers. For example, a location of the computing system 1300 can be determined based on signal strength of signals as received at the computing system 1300 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1300 such as a router, modem, switch, hub, bridge, gateway, or repeater. These may also include Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1360 may include receivers or transceivers corresponding to one or more of these GNSS systems.

Display system 1370 may include a liquid crystal display (LCD), a plasma display, an organic light-emitting diode (OLED) display, an electronic ink or "e-paper" display, a projector-based display, a holographic display, or another suitable display device. Display system 1370 receives textual and graphical information, and processes the information for output to the display device. The display system 1370 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1380 may include any type of computer support device to add additional functionality to the computer system. For example, peripheral device(s) 1380 may include one or more additional output devices of any of the types discussed with respect to output device 1350, one or more additional input devices of any of the types discussed with respect to input device 1360, one or more additional display systems of any of the types discussed with respect to display system 1370, one or more memories or mass storage devices or portable storage devices of any of the types discussed with respect to memory 1320 or mass storage 1330 or portable storage 1340, a modem, a router, an antenna, a wired or wireless transceiver, a printer, a bar code scanner, a quick-response ("QR") code scanner, a magnetic stripe card reader, an integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a LIDAR transceiver, a network device, a motor, an actuator, a pump, a conveyer belt, a robotic arm, a rotor, a drill, a chemical assay device, or some combination thereof.

The components contained in the computer system 1300 of FIG. 13 can include those typically found in computer systems that may be suitable for use with some aspects of the subject technology and represent a broad category of such computer components that are well known in the art. That said, the computer system 1300 of FIG. 13 can be customized and specialized for the purposes discussed herein and to carry out the various operations discussed herein, with specialized hardware components, specialized arrangements of hardware components, and/or specialized software. Thus, the computer system 1300 of FIG. 13 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1300 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1300 may also use a Basic Input/Output System (BIOS) or Unified Extensible Firmware Interface (UEFI) as a layer upon which the operating system(s) are run.

In some cases, the computer system 1300 may be part of a multi-computer system that uses multiple computer systems 1300, each for one or more specific tasks or purposes. For example, the multi-computer system may include multiple computer systems 1300 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1300 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1320, the mass storage 1330, the portable storage 1340, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L13), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1310 for execution. A bus 1390 carries the data to system RAM or another memory 1320, from which a processor 1310 retrieves and executes the instructions. The instructions received by system RAM or another memory 1320 can optionally be stored on a fixed disk (mass storage device 1330/portable storage 1340) either before or after execution by processor 1310. Various forms of storage may likewise be implemented as well as the necessary network interfaces and network topologies to implement the same.

While various flow diagrams provided and described above—including at least those of FIG. 10, FIG. 11, and FIG. 12—may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1300 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated.

What is claimed is:

1. A method for location-based media capture tracking, the method comprising:
    tracking a media capture device using a positioning receiver of the media capture device, wherein the media capture device is tracked to a plurality of locations about a property;
    capturing a plurality of digital media assets using the tracked media capture device, each location of the plurality of locations associated with capture of one of the plurality of digital media assets;
generating a plurality of location-based categories automatically based on the plurality of locations, wherein each location-based category of the plurality of location-based categories represents a defined area of the property that includes at least two of the plurality of locations and a direction;
categorizing each digital media asset of the plurality of digital media assets into one of the plurality of location-based categories automatically based on a location that corresponds to the digital media asset of the plurality of locations; and
filtering the plurality of digital media assets based on at least one of the plurality of location-based categories, thereby outputting a filtered set of digital media assets.

2. The method of claim 1, wherein the media capture device is an unmanned vehicle.

3. The method of claim 1, wherein the plurality of digital media assets includes at least one photo.

4. The method of claim 1, wherein the plurality of digital media assets includes at least one video.

5. The method of claim 1, further comprising:
recognizing an object in a first digital media asset of the plurality of digital media assets;
recognizing the object in a second digital media asset of the plurality of digital media assets;
generating an object-based category automatically based on recognition of the object in at least the first and second digital media assets; and
categorizing the first digital media asset and the second digital media asset automatically into the object-based category.

6. The method of claim 5, further comprising filtering the plurality of digital media assets based on the object-based category.

7. The method of claim 5, wherein the object is a face belonging to a person, and the object-based category corresponds to human faces.

8. The method of claim 5, wherein the object is an appliance of an identified brand, and the object-based category corresponds to the identified brand.

9. The method of claim 1, further comprising:
capturing a second plurality of digital media assets using a second media capture device at a second plurality of locations about the property;
categorizing each digital media asset of the plurality of digital media assets into a first category corresponding to capture with the media capture device; and
categorizing each digital media asset of the second plurality of digital media assets into a second category corresponding to capture with the second media capture device.

10. The method of claim 9, further comprising filtering a third plurality of digital media assets based on one or more of the first category or the second category, wherein the third plurality of digital media assets includes at least the plurality of digital media assets and the second plurality of digital media assets.

11. The method of claim 1, further comprising;
generating a report based on the filtered set of digital media assets; and
transmitting the report to a secondary device.

12. The method of claim 1, further comprising;
generating a unique key pair comprising a private key and a public key;
generating a hash digest of a first digital media asset of the plurality of digital media assets;
generating an encrypted digital signature by encrypting at least the hash digest using the private key;
verifying that the first digital media asset is genuine by decrypting the encrypted digital signature using the public key to retrieve the hash digest and by verifying that the hash digest corresponds to a newly generated hash digest of the first digital media asset; and
publishing the public key.

13. The method of claim 12, further comprising encrypting at least one of the first digital media asset or metadata associated with capture of the first digital media asset, the metadata including at least a timestamp.

14. A system for location-based media capture tracking, the system comprising:
a positioning receiver that tracks a media capture device, wherein the media capture device is tracked to a plurality of locations about a property;
the media capture device, wherein the media capture device captures a plurality of digital media assets, each location of the plurality of locations associated with capture of the one of the plurality of digital media assets;
a memory that stores instructions; and
a processor that executes the stored instructions, wherein execution of the stored instructions by the processor causes the processor to:
generate a plurality of location-based categories automatically based on the plurality of locations, wherein each location-based category of the plurality of location-based categories represents a defined area of the property that includes at least two of the plurality of locations and a direction,
categorize each digital media asset of the plurality of digital media assets into one of the plurality of location-based categories automatically based on a location that corresponds to the digital media asset of the plurality of locations, and
filter the plurality of digital media assets based on at least one of the plurality of location-based categories, thereby outputting a filtered set of digital media assets.

15. The system of claim 14, wherein the media capture device is an unmanned vehicle.

16. The system of claim 14, wherein the media capture device includes a camera, and wherein the plurality of digital media assets includes one or more visual digital media assets captured by the camera.

17. The system of claim 14, wherein execution of further instructions by the processor causes the processor to:
recognize an object in a first digital media asset of the plurality of digital media assets;
recognize the object in a second digital media asset of the plurality of digital media assets;
generate an object-based category automatically based on recognition of the object; and
categorize the first digital media asset and the second digital media asset automatically into the object-based category.

18. The system of claim 17, wherein execution of further instructions by the processor causes the processor to:
filter the plurality of digital media assets based also on the object-based category.

19. The system of claim 14, wherein execution of further instructions by the processor causes the processor to:

generating a unique key pair comprising a private key and a public key;

generating a hash digest of a first digital media asset of the plurality of digital media assets;

generating an encrypted digital signature by encrypting at least the hash digest using the private key, verifying that the first digital media asset is genuine by decrypting the encrypted digital signature using the public key to retrieve the hash digest and by verifying that the hash digest corresponds to a newly generated hash digest of the first digital media asset; and publishing the public key.

20. A non-transitory computer readable storage medium having embodied thereon a program, wherein the program is executable by a processor to perform a method of location-based media capture tracking, the method comprising:

tracking a media capture device using a positioning receiver of the media capture device, wherein the media capture device is tracked to a plurality of locations about a property;

capturing a plurality of digital media assets using the tracked media capture device, each location of the plurality of locations associated with capture of one of the plurality of digital media assets;

generating a plurality of location-based categories automatically based on the plurality of locations, wherein each location-based category of the plurality of location-based categories represents a defined area of the property that includes at least two of the plurality of locations and a direction;

categorizing each digital media asset of the plurality of digital media assets into one of the plurality of location-based categories automatically based on a location that corresponds to the digital media asset of the plurality of locations; and filtering the plurality of digital media assets based on at least one of the plurality of location-based categories, thereby outputting a filtered set of digital media assets.

* * * * *